(12) United States Patent
Suemitsu et al.

(10) Patent No.: US 8,874,114 B2
(45) Date of Patent: Oct. 28, 2014

(54) MOBILE COMMUNICATIONS SYSTEM, MOBILE STATION AND BASE STATION

(75) Inventors: Taisei Suemitsu, Tokyo (JP); Kuniyuki Suzuki, Tokyo (JP); Naohito Tomoe, Tokyo (JP); Masayuki Nakazawa, Tokyo (JP); Takashi Kashiwagi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 524 days.

(21) Appl. No.: 12/514,217

(22) PCT Filed: Nov. 10, 2006

(86) PCT No.: PCT/JP2006/322500
§ 371 (c)(1),
(2), (4) Date: May 8, 2009

(87) PCT Pub. No.: WO2008/056426
PCT Pub. Date: May 15, 2008

(65) Prior Publication Data
US 2010/0003990 A1    Jan. 7, 2010

(51) Int. Cl.
| | |
|---|---|
| *H04W 36/00* | (2009.01) |
| *H04W 36/36* | (2009.01) |
| *H04M 1/00* | (2006.01) |
| *H04W 72/02* | (2009.01) |
| *H04W 72/04* | (2009.01) |
| *H04W 36/18* | (2009.01) |

(52) U.S. Cl.
CPC .......... *H04W 72/02* (2013.01); *H04W 72/0406* (2013.01); *H04W 36/18* (2013.01)
USPC ........ 455/437; 455/439; 455/442; 455/552.1; 455/553.1; 370/331

(58) Field of Classification Search
USPC ................................. 455/418–420, 436–444
See application file for complete search history.

(56) References Cited

U.S. PATENT DOCUMENTS 6,064,890 A * 5/2000 Hirose et al. ................... 455/513
6,957,068 B2 * 10/2005 Hutchison et al. .......... 455/435.2
(Continued)

FOREIGN PATENT DOCUMENTS

| CN | 1750692 A | 3/2006 |
|---|---|---|
| CN | 1809194 A | 7/2006 |

(Continued)

OTHER PUBLICATIONS

U.S. Appl. No. 12/681,111, filed Apr. 1, 2010, Suemitsu, et al.
(Continued)

*Primary Examiner* — Matthew Sams
(74) *Attorney, Agent, or Firm* — Oblon, Spivak, McClelland, Maier & Neustadt, L.L.P.

(57) ABSTRACT

In a mobile communications system in which a mobile station is capable of communicating simultaneously with a plurality of base stations, the resources of the plurality of base stations are managed under the control of the mobile station. For example, the mobile station specifies a resource to a base station with a resource specifying signal, the mobile station specifies a resource to a base station with a resource specifying signal, and the mobile station specifies a resource to a base station with a resource specifying signal.

10 Claims, 32 Drawing Sheets

(56) References Cited

U.S. PATENT DOCUMENTS

| | | |
|---|---|---|
| 6,978,143 B1 | 12/2005 | Vialen |
| 7,065,367 B2 * | 6/2006 | Michaelis et al. ......... 455/452.2 |
| 7,366,106 B2 | 4/2008 | Uchida et al. |
| 7,957,352 B2 * | 6/2011 | Vanghi et al. ................. 370/335 |
| 2003/0139186 A1 * | 7/2003 | Igarashi et al. ............... 455/438 |
| 2004/0267928 A1 * | 12/2004 | Petrus ........................... 709/225 |
| 2006/0221825 A1 * | 10/2006 | Okano .......................... 370/229 |
| 2007/0032241 A1 * | 2/2007 | Busch et al. .................. 455/450 |
| 2008/0112366 A1 | 5/2008 | Uchida et al. |
| 2009/0285174 A1 | 11/2009 | Haga et al. |
| 2010/0003990 A1 * | 1/2010 | Suemitsu et al. ............. 455/442 |

FOREIGN PATENT DOCUMENTS

| | | |
|---|---|---|
| JP | 10 336098 | 12/1998 |
| JP | 2002 27519 | 1/2002 |
| JP | 2002 538655 | 11/2002 |
| JP | 2005-86688 | 3/2005 |
| JP | 2005-510950 | 4/2005 |
| JP | 2005 159486 | 6/2005 |
| JP | 2005 167403 | 6/2005 |
| JP | 2006 174039 | 6/2006 |
| JP | 2006-191554 | 7/2006 |
| WO | WO 00/76251 A1 | 12/2000 |
| WO | WO 2004/015959 A2 | 2/2004 |
| WO | WO 2004015959 A2 * | 2/2004 |
| WO | WO 2005/122414 A1 | 12/2005 |
| WO | WO 2006/062041 A1 | 6/2006 |

OTHER PUBLICATIONS

Office Action issued Feb. 22, 2011, in Japanese Patent Application No. 2008-542980 (with English translation).

Office Action issued Jul. 20, 2011, in Chinese Patent Application No. 200680056339.7 with English translation.

Combined Chinese Office Action and Search Report issued on Jan. 7, 2013, in Chinese patent Application No. 200680056339.7 with English translation.

Extended European Search Report issued Oct. 19, 2012 in Patent Application No. 06832514.1.

Office Action issued Jun. 7, 2012 in Chinese Application No. 2006800563397 (With English Translation).

Chinese Office Action issued Sep. 2, 2013, in China Patent Application No. 2006800563397 (with English translation).

Office Action dated Dec. 26, 2013, in Chinese Patent Application No. 200680056339.7 (with English-language translation).

* cited by examiner

F I G. 1
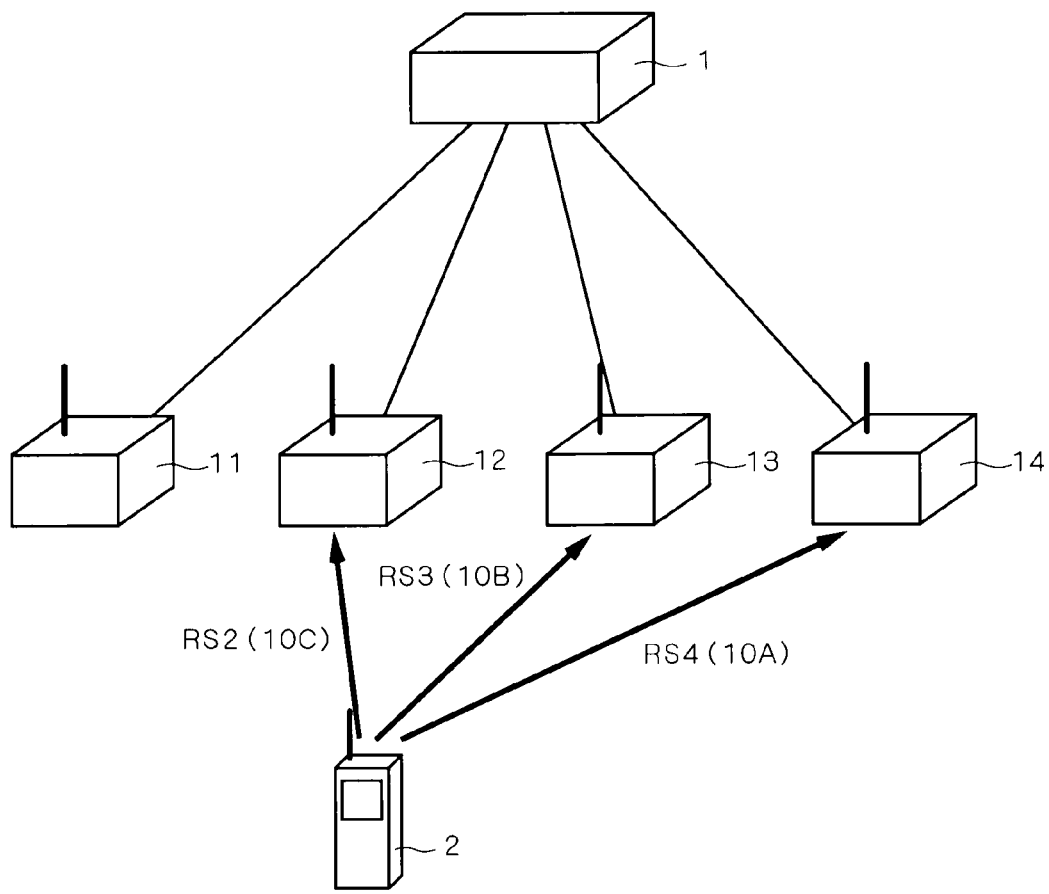

FIG. 2
(a)
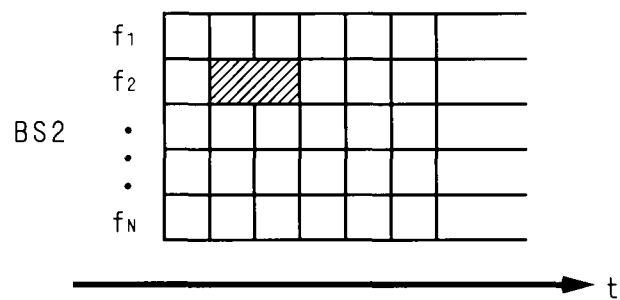
(b)
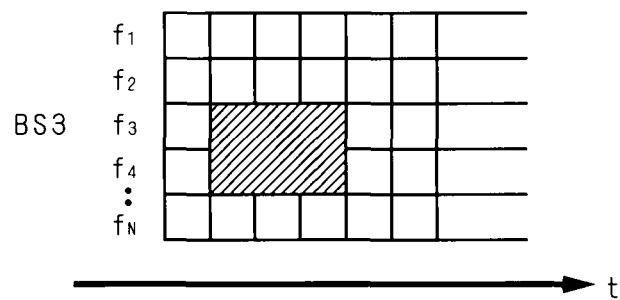
(c)
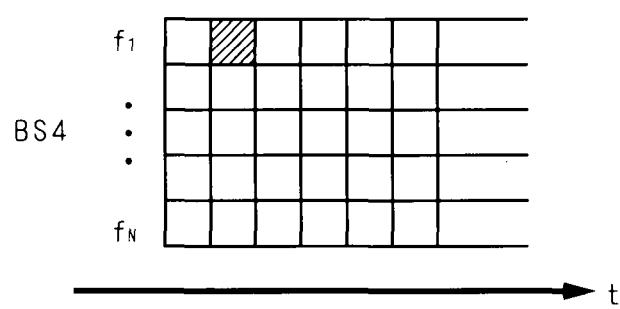

| | RESOURCE USE INFORMATION (IR) | ACCUMULATION INFORMATION (ID) | |
|---|---|---|---|
| RJ | | | |

F I G. 5
| ACCUMULATION LEVEL HEXADECIMAL IN PARENTHESES | AMOUNT OF ACCUMULATED DATA [Kbyte] |
|---|---|
| 63(3F) | >1024 |
| 62(3E) | 1008~1023 |
| ⋮ | ⋮ |
| 1(1) | 1~15 |
| 0(0) | 0 |
F I G. 6
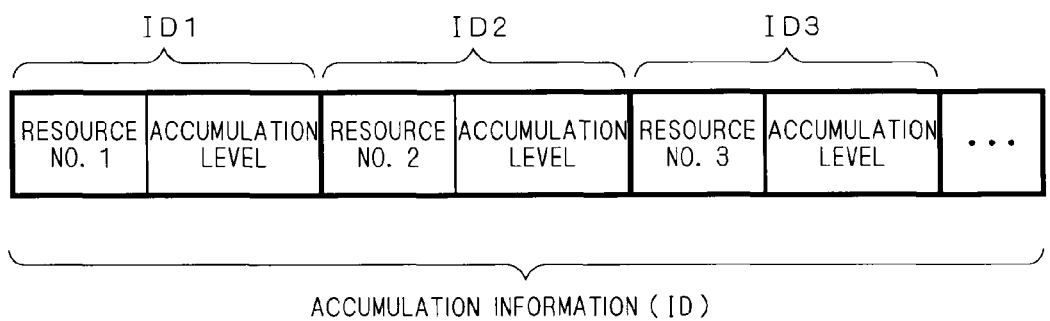

F I G . 9
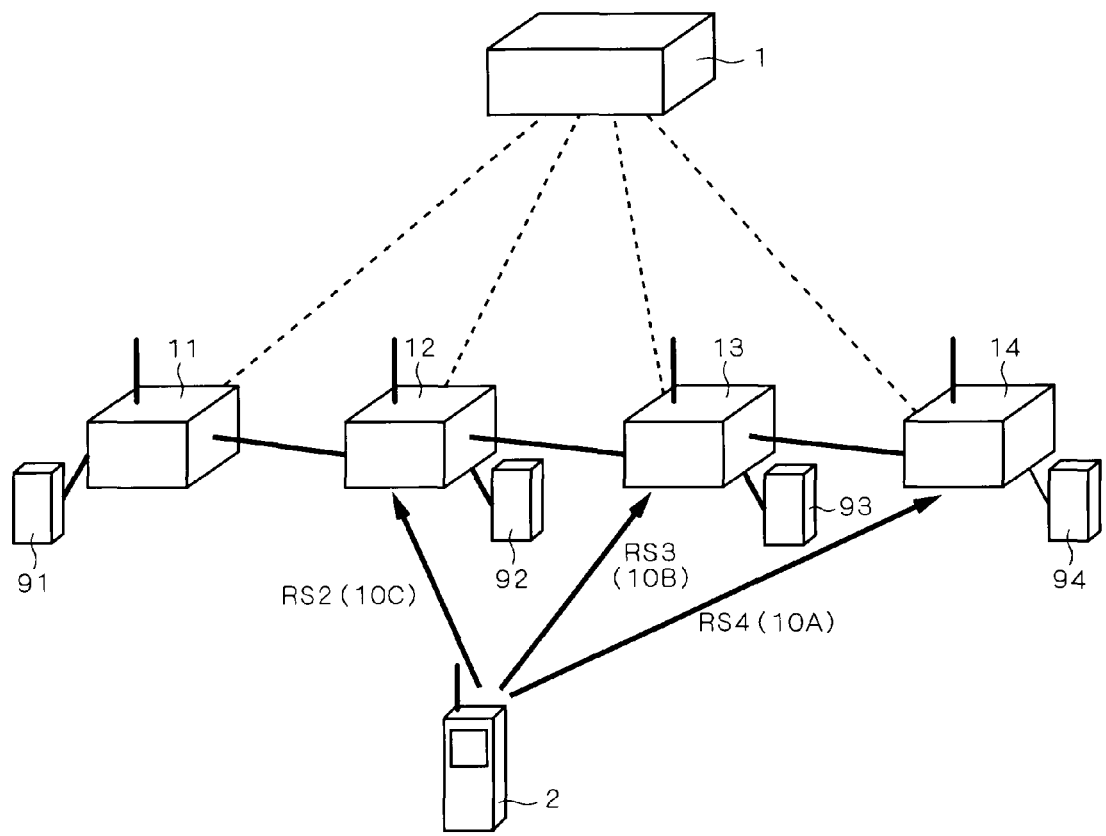

F I G . 1 2
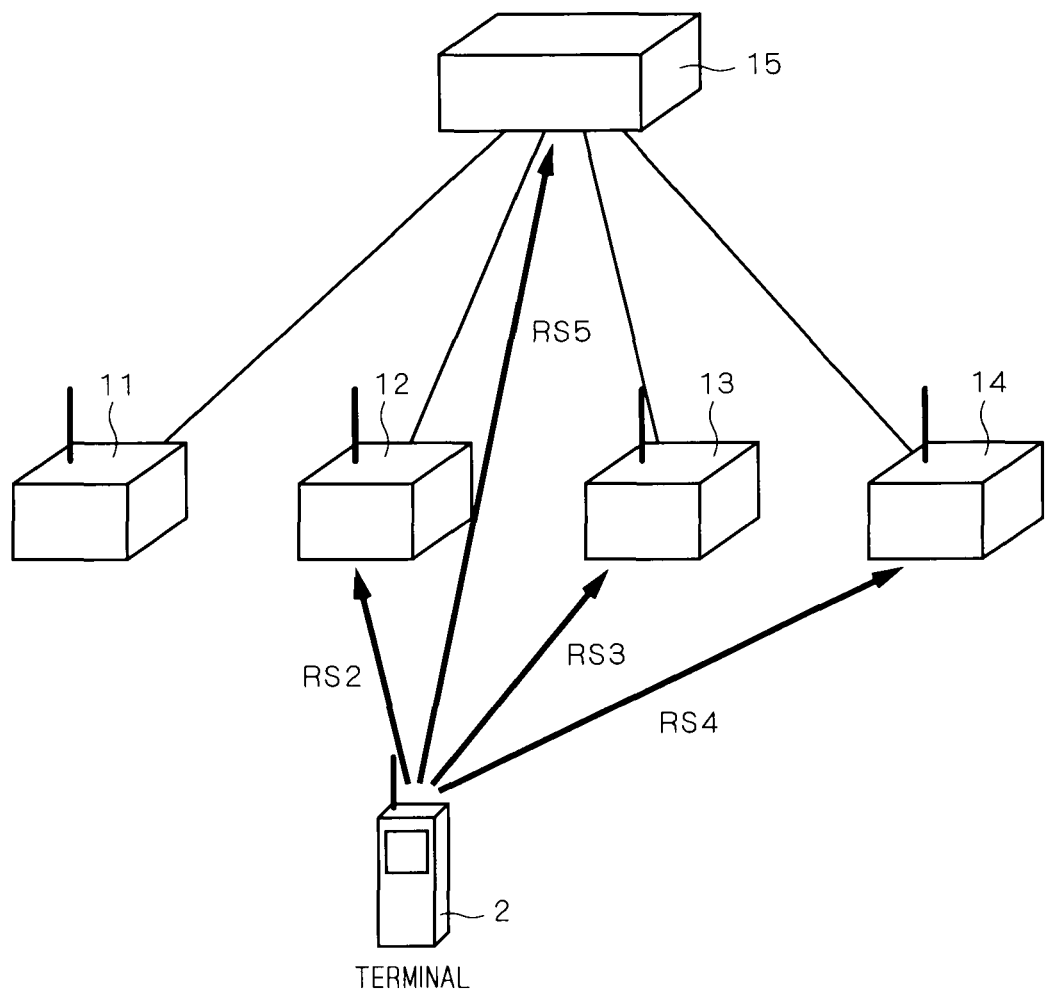

(ds2<ds3<ds4)

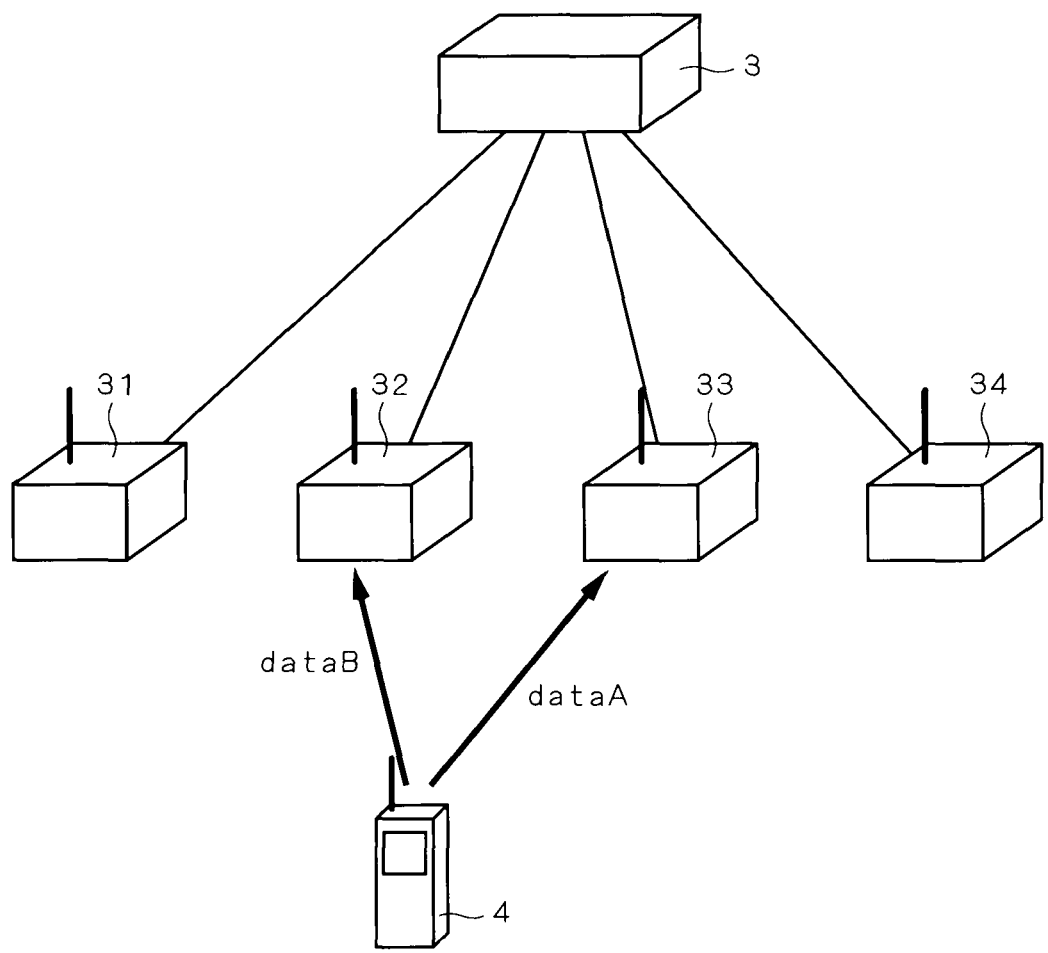
F I G . 1 6

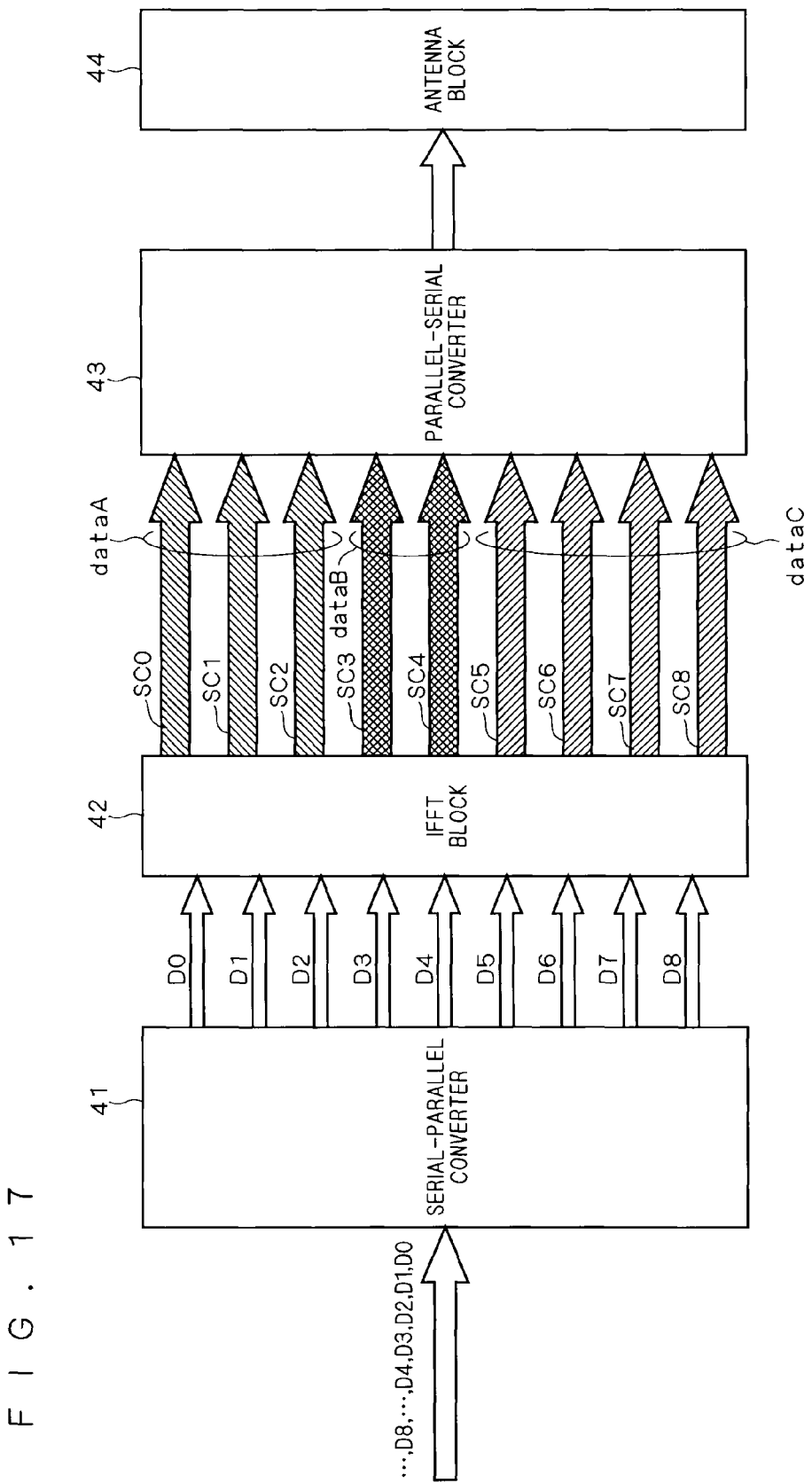

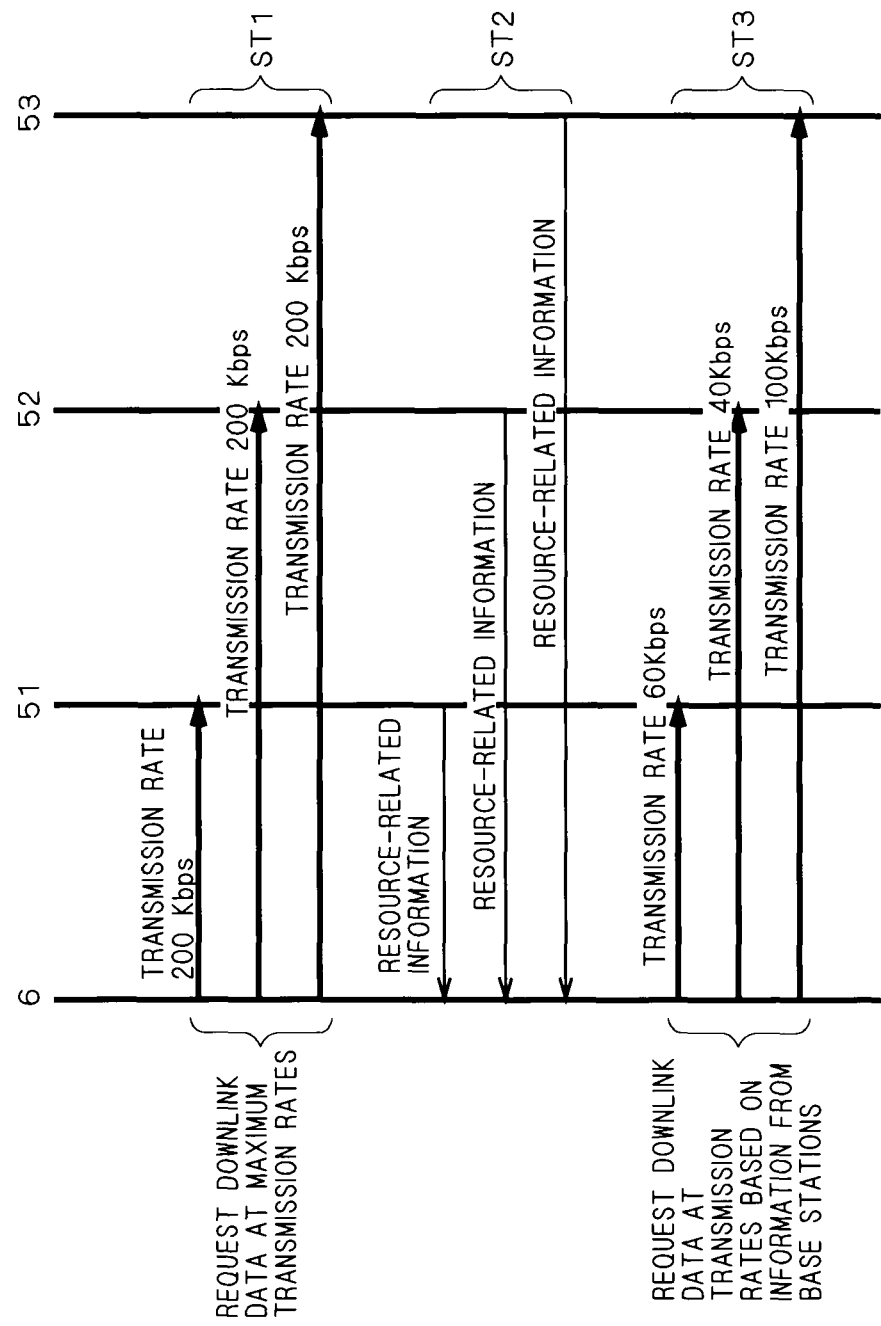

F I G . 2 1
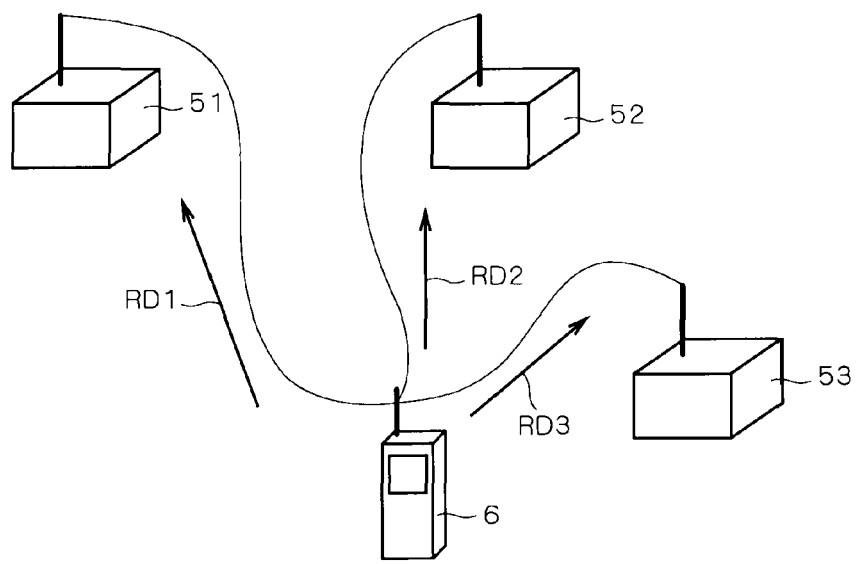
F I G . 2 2
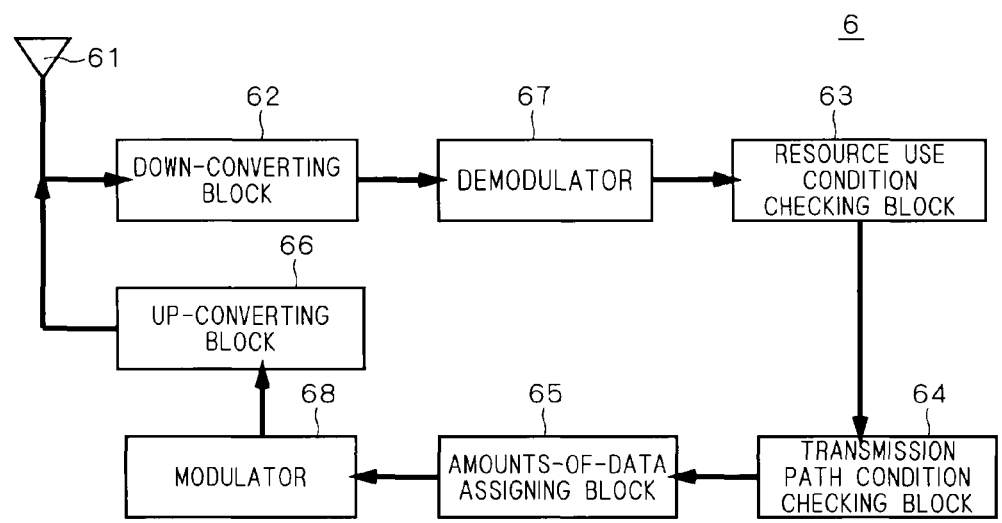

FIG. 23

| | | RESOURCE NO. | | |
|---|---|---|---|---|
| | | 0  1  2  3 | 4  5  6  7 | 8  9  10  11 |
| TRANSMISSION PATH CONDITION (CONDITION OF DISTORTION) GOOD ↑ ↓ BAD | 0<br>1<br>2<br>3<br>4<br>5<br>6<br>⋮<br>31 | (FREE)<br><br><br><br>○<br><br>○<br>○ | (FREE)<br><br><br><br><br><br>○<br>○<br>○ | (FREE) (FREE)○<br>○ |
| BASE STATION | | 51 | 52 | 53 |
| TRANSMISSION RATE | | 60kbps | 40kbps | 100kbps |

F I G . 2 5
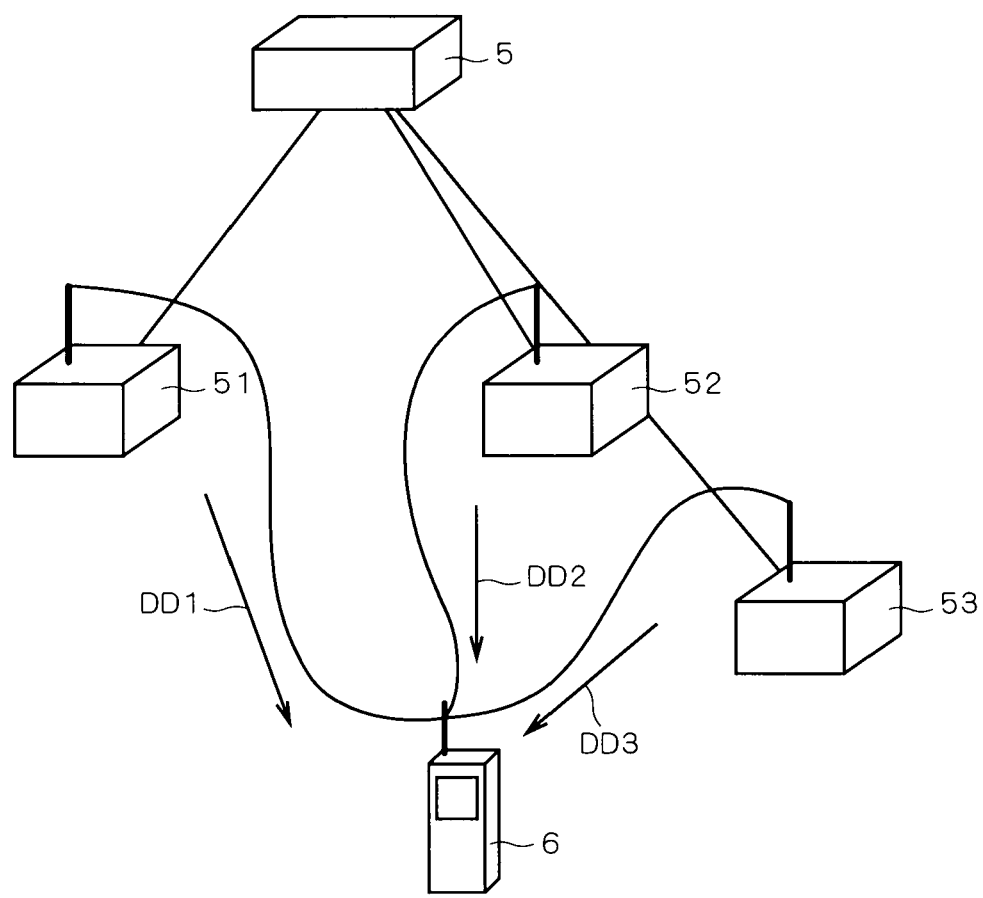

FIG. 26
(a)
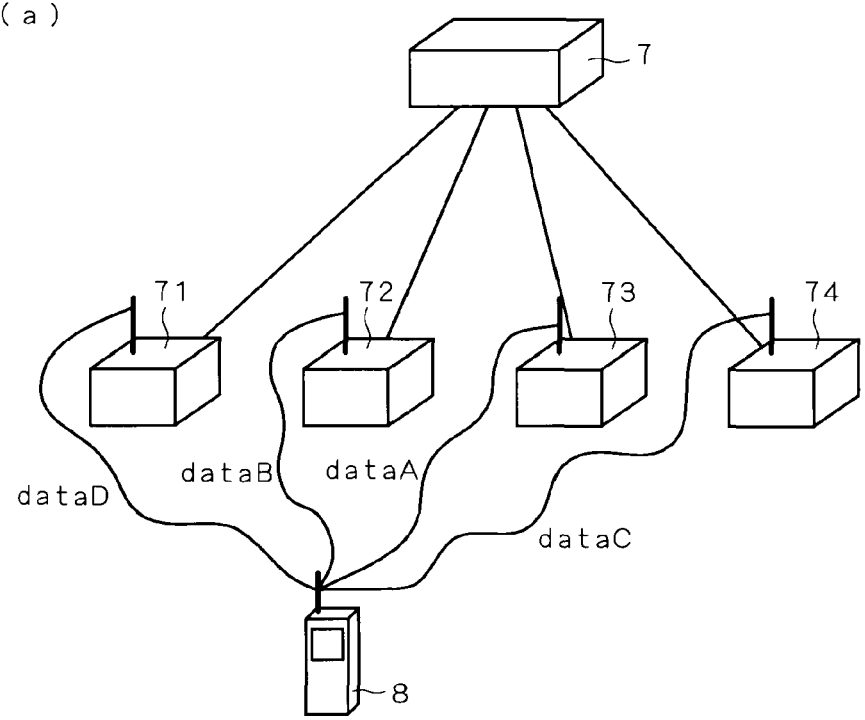
(b)
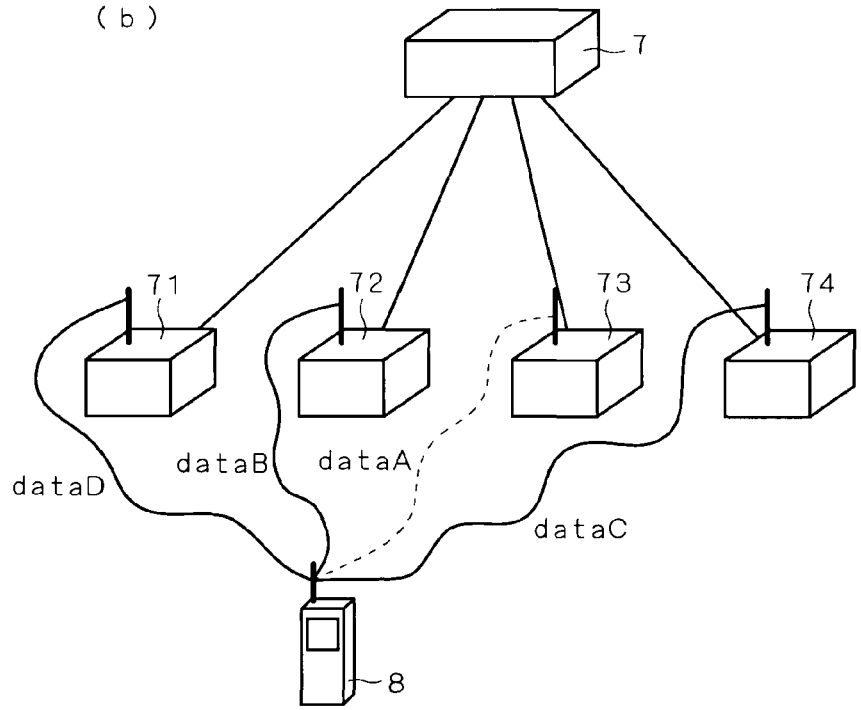

F I G . 2 8

| PARAMETER \ BASE STATION | 71 | 72 | 73 | 74 |
|---|---|---|---|---|
| LINE QUALITY (A) | 58 | 45 | 5 | 20 |
| BASE STATION DISTANCE INFORMATION(B) | 40 | 7 | 25 | 55 |
| MOBILE STATION MOVING SPEED INFORMATION (C) | 15 | 32 | 20 | 7 |
| MOBILE STATION MOVING DIRECTION INFORMATION (D) | 45 | 38 | 20 | 10 |
| ATTRIBUTE VALUE (E)=(A)-(B)+(C)+(D) | 78 | 108 | 20 | -18 |
| SELECTION OF BASE STATION IN EMERGENCY (FROM (E)) | ○ | ○ | — | × |
| TRANSMISSION RATE (FROM (A)) | 64kbps | 32kbps | — | — |

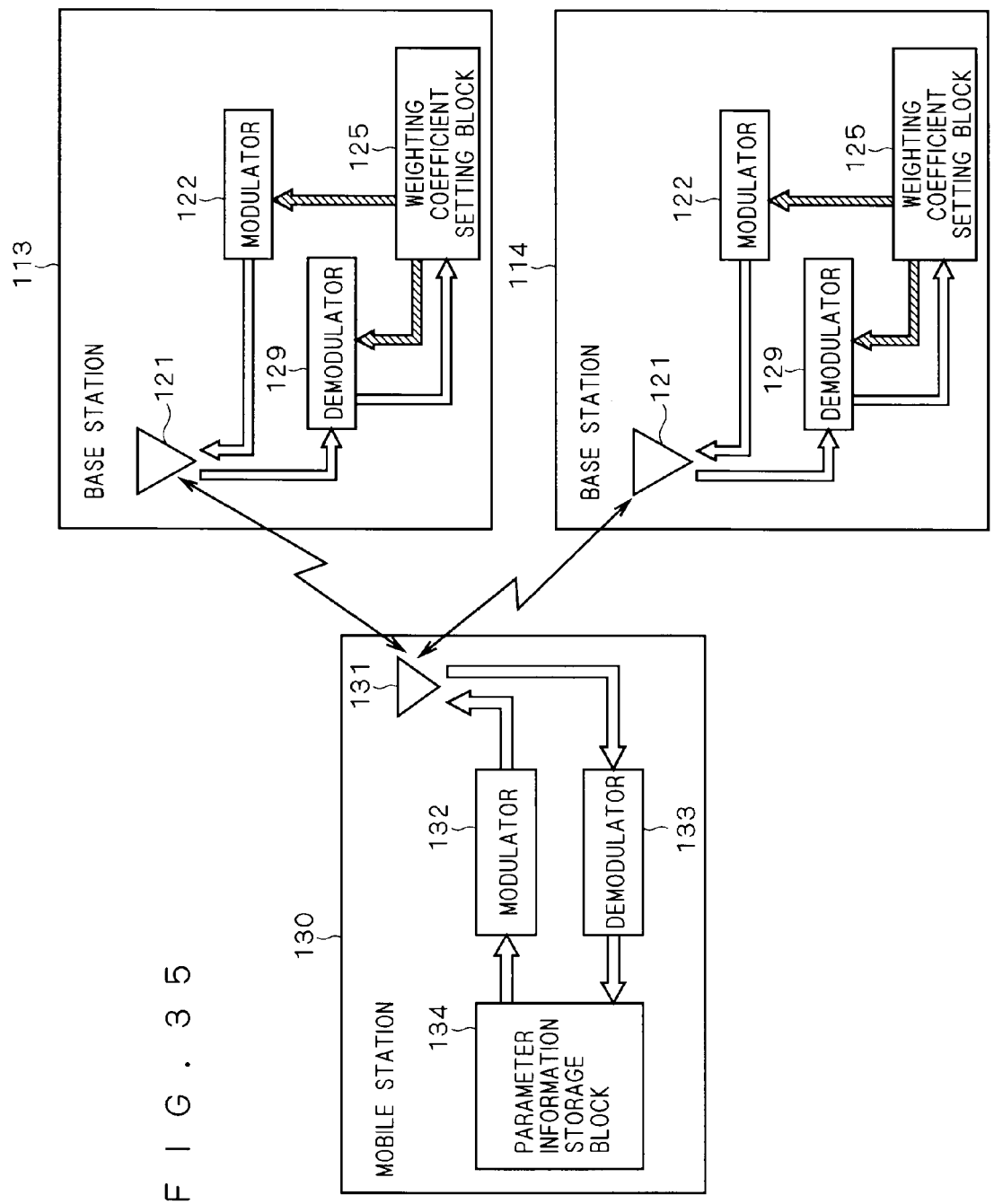
F I G . 3 5

MOBILE COMMUNICATIONS SYSTEM, MOBILE STATION AND BASE STATION

TECHNICAL FIELD

The present invention relates to a communications system in which a mobile station (terminal) can communicate simultaneously with a plurality of base stations, and to the mobile station and base stations.

BACKGROUND ART

Soft handover control adopted in W-CDMA is an example of control in which one mobile station (terminal) is connected to a plurality of base stations. Patent Document 1 Japanese Patent Application Laid-Open No. 2005-86688, for example, discloses a scheme in which, in communication between a conventional mobile station and a plurality of base stations controlled by soft handover, when the relay switching apparatus (base station control apparatus) as a data branch/merge point on the communication path is changed, the termination point of the protocol for soft handover control is changed to eliminate redundant routing paths. This scheme avoids redundant routing paths even when the mobile station moves across base stations that are subordinate to different base station control apparatuses.

Also, Patent Document 2 National publication of translation No. 2005-510950, for example, discloses a scheme in which base stations introduce a hybrid-type ARQ (Automatic Repeat reQuest) protocol to reduce the loads on the resources of the radio interface between the base and mobile stations.

Also, there is a scheme which determines the processing for sending measurements about scheduled data from base stations to a controlling base station control apparatus that controls the base stations, and in which a serving base station control apparatus (which is, among the controlling control apparatuses, an apparatus capable of data transmission of Iu connection (an interface between the core network and a system composed of one base station control apparatus and a plurality of base stations and mobile stations) with the core network as a switching network) obtains the provided bit rate of at least one base station connected to a mobile station, and it is sent from the serving base station control apparatus to the controlling base station control apparatus. This processing enables the controlling base station control apparatus in the mobile communications systems to perform congestion control of uplink transmissions having guaranteed bit rates, and also reduces the load on the interface between the base stations and base station control apparatuses. Such a scheme is disclosed in Patent Document 3 Japanese Patent Application Laid-Open No. 2006-191554, for example.

In a scheme as described in Patent Document 1, in which the termination point of the protocol is changed when handover is conducted by changing the relay switching apparatus corresponding to a base station control apparatus, the resources of radio communications are controlled by a high-order apparatus like the relay switching apparatus; accordingly, when a large number of base stations communicate simultaneously with one mobile station, the control of resources is extremely complicated and it is difficult to quickly provide the mobile station with local information from individual base stations. Also, it is not possible to merge different schemes, e.g. to allow coexistence of W-CDMA and Super 3G.

Now, in general, controlling radio communication resources by a high-order apparatus is extremely complicated for the reasons shown below:

Adjustment of time differences between individual paths (routes) is required;

All routes have to be always used for mobile stations;

Mobile stations and base stations always have to report information about measurements of all routes to the high-order apparatus;

The high-order apparatus has to perform ranking and sorting; and

When a plurality of mobile stations are in the same area, the consumption of resources, the management of measurement information, and the adjustment of time differences between routes are necessary for the number of terminals times the number of routes.

Also, in a scheme as described in Patent Document 2, in which part of the functions of the high-order apparatus is transferred to base stations in order to perform large-capacity radio communication from the base stations to mobile stations, it is not possible to send local information in individual areas around the mobile stations, and it is not possible to allow coexistence of different communication schemes, as in Patent Document 1.

Furthermore, in a method as described in Patent Document 3, in which a base station control apparatus learns provided bit rates of base stations to control congestion, it is not possible, as in Patent Documents 1 and 2, to quickly provide mobile stations with local information from individual base stations, to send local information in individual places, and to allow coexistence of different communication schemes.

For a system in which a mobile station is capable of communicating simultaneously with a plurality of base stations, an object of the present invention is to provide a mobile communications system that is capable of reducing the redundancy of resources of base stations and a base station host apparatus including a base station control apparatus and a core network.

Another object of the present invention is to provide a mobile communications system that allows quick transmission of local information about each base station to a mobile station, transmission of local information in each place, and coexistence of different communication schemes.

For a system in which a certain mobile station is capable of communicating simultaneously with a plurality of base stations, a further object of the present invention is to provide a mobile communications system in which the mobile station can control radio resources of the base stations.

These and other objects, features, aspects and advantages of the present invention will become more apparent from the following detailed description of the present invention when taken in conjunction with the accompanying drawings.

According to a first aspect of the mobile communications system of the present invention, a mobile communications system comprises: a mobile station; and a plurality of base stations, wherein said mobile station is capable of communicating simultaneously with said plurality of base stations, and resources of said plurality of base stations are managed under the control by said mobile station.

According to a second aspect of the mobile communications system of the present invention, a mobile communications system comprises: a mobile station; and a plurality of base stations, wherein said mobile station is capable of communicating simultaneously with said plurality of base stations, and wherein said mobile station comprises: a data retain/discard judging function of judging whether to discard transmitted data while transmitting data to a certain base station among said plurality of base stations; and a base station selecting function of recognizing communication attribute values for judging whether communication lines of said plurality of base stations are good or bad, and when judging that said transmitted data should be discarded, selecting as a destination of transmission of said transmitted data a favorably communicating base station that has been judged to be favorably communicating on the basis of said communication attribute values among said plurality of base stations except said certain base station.

According to a third aspect of the mobile communications system of the present invention, a mobile communications system comprises: a mobile station; and a plurality of base stations, wherein said mobile station is capable of communicating simultaneously with said plurality of base stations, and wherein said mobile station recognizes communication attribute values for judging whether communication lines of said plurality of base stations are good or bad, and said communication attribute values include information about a moving direction and a moving speed of said mobile station, and on the basis of the information about the moving direction and moving speed of said mobile station, said mobile station provides control such that, among said plurality of base stations, a non-communicating base station that exists in a direction to which said mobile station moves nearer preferentially goes into a communicating state, and such that a communicating base station that exists in a direction from which said mobile station moves away preferentially goes into a released state.

According to a fourth aspect of the mobile communications system of the present invention, a mobile communications system comprises: a mobile station; and a plurality of base stations, wherein said mobile station is capable of communicating simultaneously with said plurality of base stations, and wherein said plurality of base stations each recognize a communication attribute value for judging whether its own communication line is good or bad, and said communication attribute value includes information about a moving direction and a moving speed of said mobile station, and on the basis of the information about the moving direction and moving speed of said mobile station, each of said plurality of base stations preferentially goes into a communicating state when the base station is not communicating and exists in a direction to which said mobile station moves nearer, and preferentially goes into a released state when the base station is communicating and exists in a direction from which said mobile station moves away.

According to a fifth aspect of the mobile communications system of the present invention, a mobile communications system comprises: a mobile station; a plurality of base stations; and a high-order apparatus communicably connected to said plurality of base stations, wherein said mobile station is capable of communicating simultaneously with said plurality of base stations, and wherein said high-order apparatus recognizes communication attribute values for judging whether communication lines of said plurality of base stations are good or bad, and said communication attribute values include information about a moving direction and a moving speed of said mobile station, and on the basis of the information about the moving direction and moving speed of said mobile station, said high-order apparatus provides control such that, among said plurality of base stations, a non-communicating base station that exists in a direction to which said mobile station moves nearer preferentially goes into a communicating state, and such that a communicating base station that exists in a direction from which said mobile station moves away preferentially goes into a released state.

According to a first aspect of the mobile station of the present invention, a mobile station constitutes a mobile communications system together with a plurality of base stations, and said mobile station is capable of communicating simultaneously with said plurality of base stations, wherein said mobile station comprises: a resource determining function of, on the basis of resource-related information about at least one base station among said plurality of base stations, determining which resource of said at least one base station is to be used, and a resource specifying function of, on the basis of the contents of the determination made by said resource determining function, specifying a resource to said at least one base station.

According to a second aspect of the mobile station of the present invention, a mobile station constitutes a mobile communications system together with a plurality of base stations, wherein said mobile station comprises: a data dividing function of dividing transmission data into a plurality of divided data pieces corresponding to a plurality of resources; and a data transmitting function of assigning said plurality of resources to said plurality of base stations set without overlap, and transmitting said plurality of divided data pieces being assigned to said plurality of resources.

According to the base station of the present invention, a base station constitutes a mobile communications system together with a mobile station, and said base station is capable of communicating with said mobile station, wherein said base station comprises: a data storage for storing data for transmission/reception; and a resource-related information transmitting function of recognizing resource-related information on the basis of a condition of storage in said data storage, and transmitting the resource-related information to said mobile station.

EFFECTS OF THE INVENTION

According to the first aspect of the mobile communications system of the present invention, the resources of the plurality of base stations are managed under the control by the mobile station, whereby the management of resources of the plurality of base stations in the entire system is facilitated, and the redundancy of resource control is eliminated.

In addition, the mobile station can choose base stations with which it communicates because the mobile station manages the resources.

According to the second aspect of the mobile communications system of the present invention, the mobile station has a base station selecting function of selecting a favorably communicating base station by checking communications on the basis of the communication attribute values, and selecting the favorably communicating base station as a destination of transmission data that the data retain/discard judging function has decided to discard, whereby, even when a communicating base station falls into difficulties in transmission of data, the transmission data can be sent to the favorably communicating base station to normally complete the transmission of the transmission data.

According to the third aspect of the mobile communications system of the present invention, under the control by the mobile station based on the information about the moving direction and moving speed of the mobile station, control is provided such that, among the plurality of base stations, a non-communicating base station existing in a direction to which the mobile station moves nearer goes into a communicating state at an early stage, and a communicating base station existing in a direction from which the mobile station moves away goes into a released state at an early stage, whereby the throughput of the mobile communications system is enhanced.

According to the fourth aspect of the mobile communications system of the present invention, under the control by each of the plurality of base stations themselves based on the information about the moving direction and moving speed of the mobile station, control is provided such that a non-communicating base station existing in a direction to which the mobile station moves nearer goes into a communicating state at an early stage, and a communicating base station existing in a direction from which the mobile station moves away goes into a released state at an early stage, whereby the throughput of the mobile communications system is enhanced.

According to the fifth aspect of the mobile communications system of the present invention, under the control by the high-order apparatus based on the information about the moving direction and moving speed of the mobile station, control is provided such that, among the plurality of base stations, a non-communicating base station existing in a direction to which the mobile station moves nearer goes into a communicating state at an early stage, and a communicating base station existing in a direction from which the mobile station moves away goes into a released state at an early stage, whereby the throughput of the mobile communications system is enhanced.

In addition, according to the third to fifth aspects of the mobile communications system, since a non-communicating base station existing in a direction to which the mobile station moves nearer is put into a communicating state at an early stage, it is possible to early obtain local information that the base station existing in that direction generally has about its neighborhood, whereby local information for each place around the mobile station can be obtained.

According to the first aspect of the mobile station of the present invention, the resources of at least one base station are managed under the control by the mobile station, whereby the management of resources of the at least one base station is facilitated in the entire mobile communications system including the mobile station, and the redundancy of resource control is eliminated.

According to the second aspect of the mobile station of the present invention, the mobile station has a data transmitting function in which a plurality of divided data pieces are transmitted while assigned to a plurality of resources assigned to a plurality of base stations without overlap, whereby it is possible to transmit/receive larger capacities of data without overlap of data, i.e. without transmitting/receiving data of the same contents to/from the plurality of base stations.

The base station of the present invention has a resource-related information transmitting function of transmitting resource-related information to the mobile station, whereby the resources of the base station can be controlled on the basis of the resource-related information from the base station in the entire mobile communications system including the base and mobile stations. As a result, the management of resources is facilitated and the redundancy of resource control is eliminated.

BRIEF DESCRIPTION OF THE DRAWINGS

FIG. 1 A diagram illustrating the configuration of a mobile communications system according to a first preferred embodiment of the present invention.

FIG. 2 Diagrams illustrating resources of base stations that are specified by a mobile station when radio communication between the mobile and base stations is performed by a multi-carrier transmission scheme in the first preferred embodiment.

FIG. 5 A diagram illustrating accumulation levels in the accumulation information on the broadcast channel shown in FIG. 3.

FIG. 6 A diagram illustrating the details of the accumulation information.

FIG. 9 A diagram illustrating an effect of the first preferred embodiment.

FIG. 12 A diagram illustrating how the mobile communications system of the first preferred embodiment is used when Method 3 is adopted.

FIG. 16 A diagram illustrating how the mobile communications system of the first preferred embodiment is used when Method 5 is adopted.

FIG. 17 A diagram illustrating part of the internal configuration of the mobile station shown in FIG. 16.

FIG. 20 A diagram illustrating a procedure by which the mobile station shown in FIG. 19 determines transmission rates of downlink data.

FIG. 21 A diagram illustrating how the mobile communications system of the second preferred embodiment is used.

FIG. 22 A block diagram illustrating the internal configuration of a mobile station in the mobile communications system of the second preferred embodiment.

FIG. 23 A diagram illustrating a criterion in tabular form for determining transmission rates from resource use conditions and transmission path conditions.

FIG. 25 A diagram illustrating how the mobile communications system of the second preferred embodiment is used.

FIG. 26 Diagrams illustrating the configuration of a mobile communications system according to a third preferred embodiment of the present invention.

FIG. 28 A diagram illustrating in tabular form the contents of selection of base stations in emergency based on relevancy parameters.

FIG. 35 A block diagram illustrating the configurations of base stations and a mobile station in a second system in the mobile communications system of the third preferred embodiment.

BEST MODE FOR CARRYING OUT THE INVENTION

First Preferred Embodiment

Figures 3, 4:
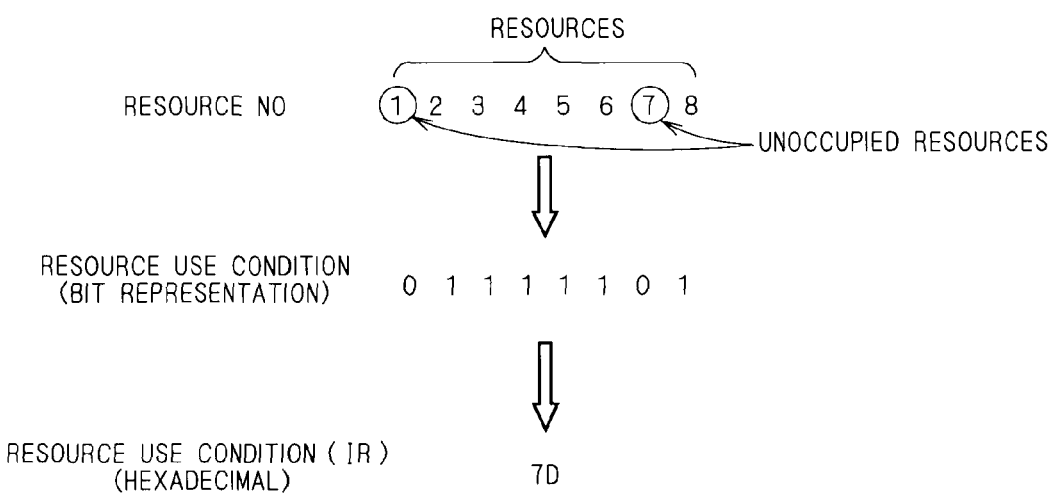
FIG. 3 A diagram illustrating the contents of a broadcast channel.
FIG. 4 A diagram illustrating the details of resource use information on the broadcast channel shown in FIG. 3.

FIG. 1 is a diagram illustrating the configuration of a mobile communications system according to a first preferred embodiment of the present invention. As shown in the diagram, this system has a network configuration in which a plurality of base stations 11 to 14 are connected to a base station host apparatus 1 including a core network, base station control apparatus, and the like, where a mobile station (terminal) 2 is capable of communicating simultaneously with a plurality of base stations among the base stations 11 to 14.

In FIG. 1, the base station host apparatus 1 is connected to the plurality of base stations 11 to 14, and sends/receives control signals to and from the base stations, so as to control the base stations 11 to 14 and to simultaneously distribute the same data to the multiple base stations 11 to 14 connected thereto. The base stations 11 to 14 each have a function of communicating with the mobile station 2 by radio. In FIG. 1, the base station 11 is not in radio communication with the mobile station 2, and the base stations 12 to 14 are in radio communication with the mobile station 2. The mobile station 2 is capable of communicating simultaneously with the base stations 11 to 14 by radio. In this way, FIG. 1 shows an example in which the mobile station 2 and the base stations 12 to 14, among the base stations 11 to 14, are communicating. The base station host apparatus and the base stations may be connected either by radio transmission or wired transmission.

In such a configuration, the base stations 11 to 14 can simultaneously process multiple radio resources, and FIG. 1 shows three (radio) resources 10A to 10C. As to the radio resources, when the radio communication adopts a multi-carrier transmission such as OFDM (Orthogonal Frequency Division Multiplexing), for example, the resource 10A can be a subcarrier, the resource 10B can be another subcarrier at a different frequency from the resource 10A, and the resource 10C can be another subcarrier at a different frequency from the resources 10A and 10B.

In FIG. 1, the mobile station 2 specifies the resource 10C to the base station 12 with a resource specifying signal RS2. Also, the mobile station 2 specifies the resource 10B to the base station 13 with a resource specifying signal RS3. Also, the mobile station 2 specifies the resource 10A to the base station 14 with a resource specifying signal RS4.

In this way, in the mobile communications system of the first preferred embodiment, the mobile station 2 performs radio communication simultaneously with the base stations 12 to 14, and specifies radio resources respectively to the base stations 12 to 14, whereby the management of radio resources to the base stations 11 to 14 is facilitated, and the management of radio resources of the base stations 11 to 14 by the base station host apparatus 1 is also facilitated. This is because the loads on the base stations 11 to 14 and the base station host apparatus 1 are reduced as the mobile station 2 specifies the radio resources of the base stations 11 to 14.

Also, the mobile communications system of the first preferred embodiment allows coexistence of different communication schemes. This is described in detail below.

The above-described systems disclosed in Patent Documents 1 to 3 assume that a plurality of base stations X and Y connected to one core network are in radio communication simultaneously with one mobile station (terminal) A.

Coexistence of different communication schemes means that another different core network exists, and a base station control apparatus and base stations Z and W exist as its subordinates and are also connected to the mobile station A.

Patent Documents 1 to 3 disclose nothing about coexistence of different core networks, and the systems disclosed in Patent Documents 1 to 3 do not allow such coexistence of different communication schemes because, as long as a core network controls radio resources, the core network cannot know radio resources of another core network.

In contrast, the mobile communications system of the first preferred embodiment adopts a configuration in which the mobile station controls radio resources, and thus allows coexistence of different communication schemes. That is, this is possible because, when the mobile station is capable of controlling radio resources, the mobile station itself can assign resources for communications with a plurality of base stations that belong to different core networks.

In this way, even when a plurality of base stations adopt different communication schemes, the mobile station can recognize the differences and vary the communications with the individual base stations according to the schemes.

Also, the control of resources to a plurality of base stations can be achieved quickly because the mobile station 2 can specify the resources by communicating by radio simultaneously with the plurality of base stations 12 to 14.

FIG. 2 is a diagram illustrating the resources of the base stations 11 to 14 that the mobile station 2 specifies, where the radio communication between the mobile station 2 and the base stations 11 to 14 adopts a multi-carrier transmission scheme. As shown in FIG. 1, the mobile station 2 is in communication with the base stations 12 to 14, and FIG. 2 shows how resources are specified to the base stations 12 to 14 in association with FIG. 1.

In the diagram (a) of FIG. 2, the radio resource BS2 shows the radio resources to the base station 12. The diagonally shaded area shows the resource 10C that the mobile station 2 specifies with the resource specifying signal RS2. Among the frequencies f1 to fN used by the base station 12, the mobile station 2 specifies the subcarrier having a center frequency f2 as the resource 10C only in a certain time slot (the two squares of the radio resource BS2 of FIG. 2).

Also, in the diagram (b) of FIG. 2, the radio resource BS3 shows the radio resources to the base station 13. As with the radio resource BS2, the diagonally shaded area shows the resource that the mobile station 2 specifies with the resource specifying signal RS3. Among the frequencies f1 to fN used by the base station 13, the mobile station 2 specifies the subcarriers having center frequencies f3 and f4 as the resource 10B only in a certain time slot (the four squares of the radio resource BS3 of FIG. 2).

Also, in the diagram (c) of FIG. 2, the radio resource BS4 shows the radio resources to the base station 14. As with the radio resources BS2 and BS3, the diagonally shaded area shows the resource that the mobile station 2 specifies with the resource specifying signal RS4. Among the frequencies f1 to fN used by the base station 14, the mobile station 2 specifies the subcarrier having a center frequency f1 as the resource 10A only in a certain time slot (the one square of the radio resource BS4 of FIG. 2).

When the multi-carrier transmission is a scheme such as OFDM in which adjacent subcarriers are orthogonally multiplexed, communication with reduced interference can be achieved even when adjacent center frequencies (e.g. f1 and f2, f2 and f3) are simultaneously used for radio communication.

In this way, the mobile station 2 can efficiently utilize the radio resources of the base stations 12 to 14. Also, the mobile station 2 can inform the base stations 12 to 14 about the resources to be used, only with small amounts of information about subcarrier numbers (1, 2 of f1, f2, . . . ) with the resource specifying signals RS2 to RS4.

Methods by which the mobile station 2 specifies the resources of the base stations 12 to 14 can be generally divided into the methods 1 to 5 shown below.

Method 1: The base stations 12 to 14 give information related to the resources of individual base stations, and the mobile station 2 specifies resources of the base stations 12 to 14 on the basis of the resource-related information. For example, the resource-related information includes resource use information IR indicating, e.g., the conditions of congestion of radio resources, and accumulation information ID indicating, e.g., the amounts of accumulated data, or the amounts of accumulated data assigned to the resources.

Method 2: A resource-related information reporting base station informs the mobile station of resource-related information about a certain number of adjacent base stations, and the mobile station specifies resources of the reporting base station and the certain number of adjacent base stations. For example, when the base station 13 serves as the resource-related information reporting base station and informs the mobile station 2 of resource-related information also about the base stations 12 and 14, then the mobile station 2 can obtain the resource-related information about the three base stations 12 to 14 from one base station 13, and it can specify resources to the base stations 12 to 14 by judging which resources are to be specified.

Method 3: The role of the base station host apparatus 1 is performed by another base station that is equivalent to the base stations 11 to 14.

Method 4: The mobile station 2 controls resources in such a way as to minimize the transmission power of base stations as small as possible.

Method 5: The mobile station 2 sends and receives different data to and from multiple different base stations.

Now, the method 1 will be described in detail taking FIG. 1 as an example. The base stations 11 to 14 non-directionally send information about the conditions of use of their respective radio resources and information about the accumulation of data, as broadcast information (resource-related information) through broadcast channels to all mobile stations in the cells of the base stations. The conditions of use of radio resources mean the conditions of congestion on the radio resources, and the information about the accumulation of data means information about the amounts of data that, e.g. have been sent from the base station host apparatus 1 to the base stations 11 to 14 and accumulated inside the base stations 11 to 14.

FIG. 3 is a diagram illustrating the contents of resource-related information RJ carried on a broadcast channel. As shown in the diagram, the resource-related information RJ is composed of the resource use information IR and accumulation information ID.

FIG. 4 is a diagram illustrating the details of the resource use information IR. As shown in the diagram, each resource is assigned a resource number, and the condition of use of each resource is shown in bit representation, such as "1" for a resource being occupied and "0" for a resource being unoccupied. Actual data is represented in hexadecimal notation, and the resource use information IR in the example of FIG. 4 is represented as "7D" in hexadecimal.

FIG. 5 is a diagram illustrating accumulation levels in the accumulation information ID. As shown in the diagram, the accumulation information ID is divided into 64 levels on the basis of the amounts of accumulated information [kbyte], and the 64 levels represented in hexadecimal are carried on broadcast channels as accumulation levels. A level exists for each resource, and the level information is stored as the accumulation information ID in the resource-related information RJ sequentially from the first resource.

FIG. 6 is a diagram illustrating the details of the accumulation information ID. As shown in the diagram, the accumulation information ID is composed of accumulation information for each resource, as ID1, ID2, ID3, . . . . Each IDi (i=1, 2, 3, . . . ) contains an accumulation level in a pair with a resource number i.

In the case of CDMA (Code Division Multiple Access), the transmissions of the above-described resource-related information RJ from base stations to a mobile station are performed as shown below. The base stations send the information to the mobile station respectively with different spread codes being multiplied. The mobile station receives the resource-related information RJ on the broadcast channels, and then demodulates the resource-related information RJ from the individual base stations by using the spread codes corresponding to the individual base stations.

On the other hand, in the case of TDMA (Time Division Multiple Access), individual base stations place the resource-related information RJ on time slots assigned to them. The mobile station obtains the resource-related information RJ from the base stations according to the assigned time slots, and identifies resource-related information RJ about each base station.

In the case of OFDM, the mobile station assigns a subcarrier having a certain center frequency for the reception of the broadcast channel sent from a certain base station, and obtains the resource-related information RJ sent from that base station from the subcarrier. Subcarriers having different center frequencies are assigned to the broadcast channels sent from other base stations.

Thus, the mobile station is capable of identifying from which of multiple base stations the resource-related information RJ was transmitted.

Figure 7:
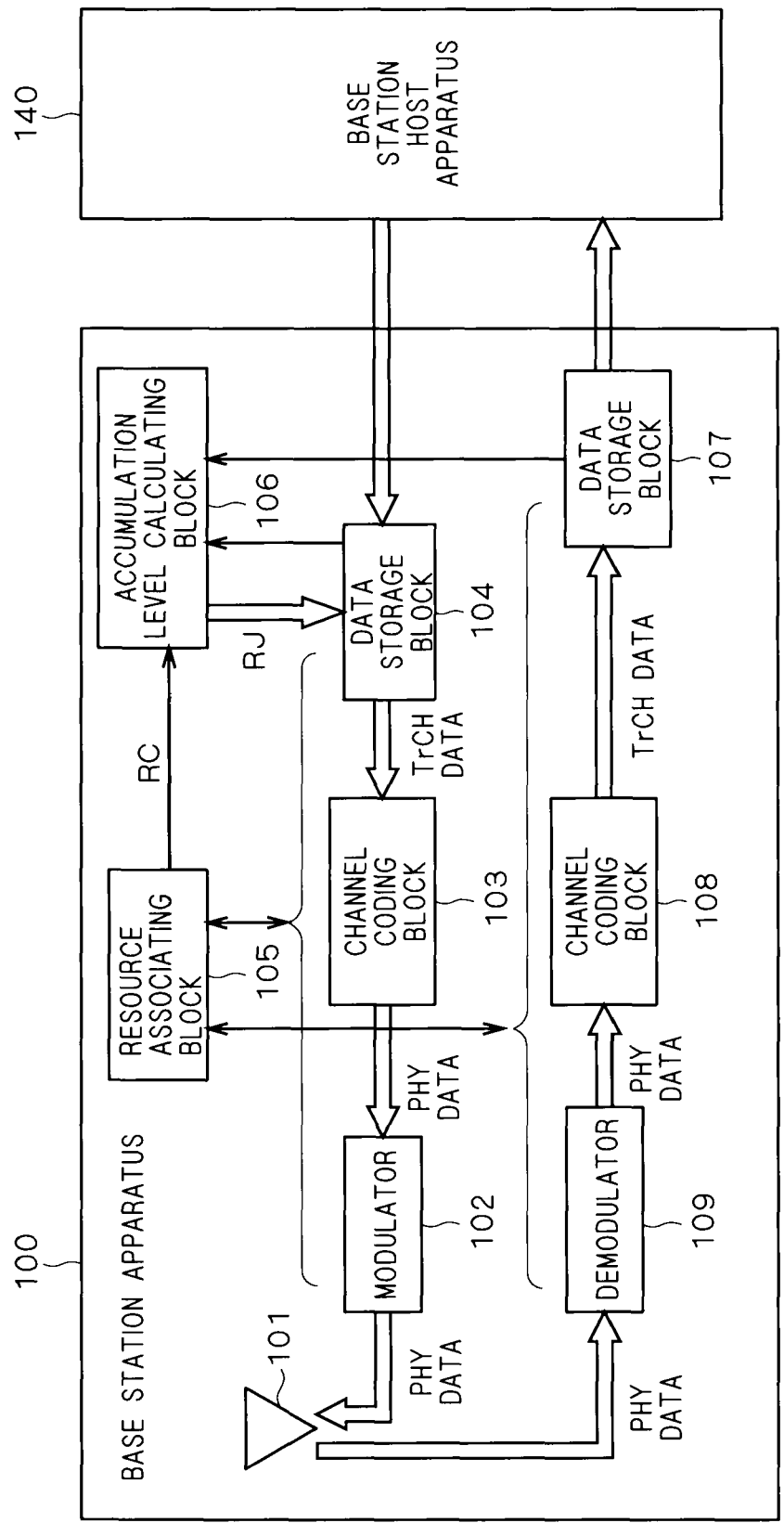
FIG. 7 A block diagram illustrating the internal configuration of a base station in the mobile communications system of the first preferred embodiment.

FIG. 7 is a block diagram illustrating the internal configuration of a base station in the mobile communications system of the first preferred embodiment. The base station 100 corresponds to each of the base stations 11 to 14 of FIG. 1.

The base station 100 is configured to implement the method 1 such that it can send resource-related information RJ that is needed when the mobile station 2 controls resources.

An antenna block 101 performs transmission/reception with the mobile station 2 or other base stations. A modulator 102 modulates data to be transmitted. A channel coding block 103 converts the data format (TrCH: Transport Channel) sent from the base station host apparatus 140 through a data storage block 104 into a data format for radio transmission (PhCH: Physical Channel).

The data storage block 104 temporarily stores data sent from the base station host apparatus 140 until the base station 100 processes it. A resource associating block 105 recognizes resource association information RC for associating resources between the three blocks including the modulator 102, channel coding block 103, and data storage block 104, and for associating resources between the three blocks including a demodulator 109, channel coding block 108, and data storage block 107.

An accumulation level calculating block 106 calculates the accumulation levels on the basis of the amounts of data that are stored in the data storage blocks 104 and 107 without being processed, and it obtains accumulation information ID in which the accumulation levels are associated with individual resources on the basis of the resource association information, and it generates resource-related information RJ by adding the resource use information IR to the accumulation information ID.

The data storage block 107 temporarily stores uplink data before it is transmitted to the base station host apparatus 140. The channel coding block 108 converts the radio-received data format (PhCH) into the data format for transmission to the high-order apparatus (TrCH). The demodulator 109 demodulates received channels. The base station host apparatus 140 can be a base station control apparatus, a core network, or the like.

Now, referring to FIG. 7, the contents of downlink data transmission by the base station 100 will be described. The base station 100 receives data from the base station host apparatus 104 and then stores it into the data storage block 104. When the base station 100 and the base station host apparatus 140 are connected through an IP network, the data from the base station host apparatus 140 is sent by IP format. When the base station 100 and the base station host apparatus 140 are connected through an ATM network, it is sent by ATM format. However, it is assumed that the data has been converted to TrCH format when it is stored. The contents of the conversion are not described herein.

Among the data pieces stored in the data storage block 104, the channel coding block 103 applies channel coding processing sequentially from data arrived and stored earlier. The data is converted from TrCH to PhCH in the channel coding processing. After that, the PhCH data is modulated in the modulator 102 according to the scheme, such as QPSK, CDMA, or OFDM, up-converted to an RF signal, and sent from the antenna block 101 to the mobile station 2.

The resource associating block 105 stores resource association information RC indicating, e.g. in tabular form, which of the data pieces stored in the data storage block 104 should be channel-coded and mapped to radio resources of the modulator 102. The modulator 102, channel coding block 103, and data storage block 104 perform their respective operations referring to the resource association information RC stored in the resource associating block 105.

For example, when data with stored data identification number=3 sent from the base station host apparatus 140 is associated in the modulator 102 with radio resource number=5, the channel coding block 103 performs channel coding processing on the basis of channel coding information parameters about the stored data identification number=3 on the basis of the resource association information RC, and assigns the converted PhCH data to the radio resource number=5. The channel coding information parameters include information about the numbers of bits as described in 3GPP TS25.212, for example. In OFDM, the modulator 102 performs processing like assigning it to the fifth subcarrier.

When the mobile station 2 controls resources, the resource associating block 105 receives resource assignment information from the mobile station 2, and associates resources to obtain the resource association information RC. When the base station host apparatus 140 controls resources, it receives resource assignment information from the base station host apparatus 140 in a message separate from data, and assigns resources to obtain the resource association information RC.

Next, referring to FIG. 7, the process by which the base station 100 receives uplink data will be described. Data received in the antenna block 101 is down-converted (the down converter is not graphically shown) and inputted to and demodulated in the demodulator 109. The demodulated PhCH data is channel-coded in the channel coding block 108 and converted to TrCH data. The data converted to TrCH is temporarily stored in the data storage block 107, and sent to the base station host apparatus 140 sequentially from data stored earlier.

When the base station 100 and the base station host apparatus 140 are connected through an IP network, the transmission from the data storage block 107 to the base station host apparatus 140 is sent by IP format. When the base station 100 and the base station host apparatus 140 are connected through an ATM network, it is sent by ATM format. The conversions to IP format and ATM format are not described herein.

The resource association information RC stored in the resource associating block 105 also includes information about association indicating to which stored data identification number the data of a certain radio resource demodulated in the demodulator 109 is to be assigned by the channel coding by the channel coding block 108.

The data storage block 107, channel coding block 108, and demodulator 109 refer to the resource association information RC in the resource associating block 105, and performs operations respectively similar to the operations performed by the modulator 102, channel coding block 103, and data storage block 104 for transmission of downlink data.

Next, referring to FIG. 7, the process for generating the resource-related information RJ in the accumulation level calculating block 106 of the base station 100 will be described.

The accumulation level calculating block 106 monitors the data storage blocks 104 and 107, and is capable of knowing how much data are stored respectively in the data storage blocks 104 and 107. However, what can be known only with the information from the data storage blocks 104 and 107 is only the amount of stored data for each resource between the base station 100 and the base station host apparatus 140. Accordingly, it receives from the resource associating block 105 the resource association information RC indicating associations between the stored data identification numbers in the data storage blocks 104 and 107 and the radio resources processed in the modulator 102 and the demodulator 109.

On the basis of the information about the storage in the data storage blocks 104 and 107 and the resource association information RC from the resource associating block 105, the accumulation level calculating block 106 calculates an accumulation level for each radio resource and obtains the accumulation information ID (see FIG. 6), and it generates a broadcast channel format for the resource-related information RJ in which the resource use information IR is added to the accumulation information ID, and stores it in the data storage block 104.

Then, when downlink data is to be processed, the channel coding block 103 performs channel coding, the modulator 102 performs modulation, and the data is up-converted (the up converter is not graphically shown) to become an RF signal, and the resource-related information RJ is carried on a broadcast channel and broadcasted from the antenna block 101 to mobile stations.

In this way, the resource-related information RJ, including the accumulation information ID defining the accumulation levels for individual radio resources, is broadcasted through a broadcast channel from the base station 100 to the mobile station 2. When the accumulation levels are added to data, instead of being carried on a broadcast channel of each base station 100, the accumulation level calculating block 106 stores the accumulation levels of individual radio resources directly into the data storage block 104 without generating a broadcast channel format. Then, the channel coding block 103 multiplexes the accumulation level information and data sent from the high-order apparatus to implement the processing.

Thus, the base station 100 shown in FIG. 7 has a resource-related information transmitting function of transmitting resource-related information RJ to mobile stations, whereby the resource control to the base stations in the entire mobile communications system of the first preferred embodiment can be achieved on the basis of the resource-related information from the base stations 100. This facilitates the management of resources and eliminates the redundancy of resource control.

Next, a procedure by which the mobile station selects radio resources of base stations after receiving the resource-related information RJ from base stations configured as shown in FIG. 7 will be described.

Figure 8:
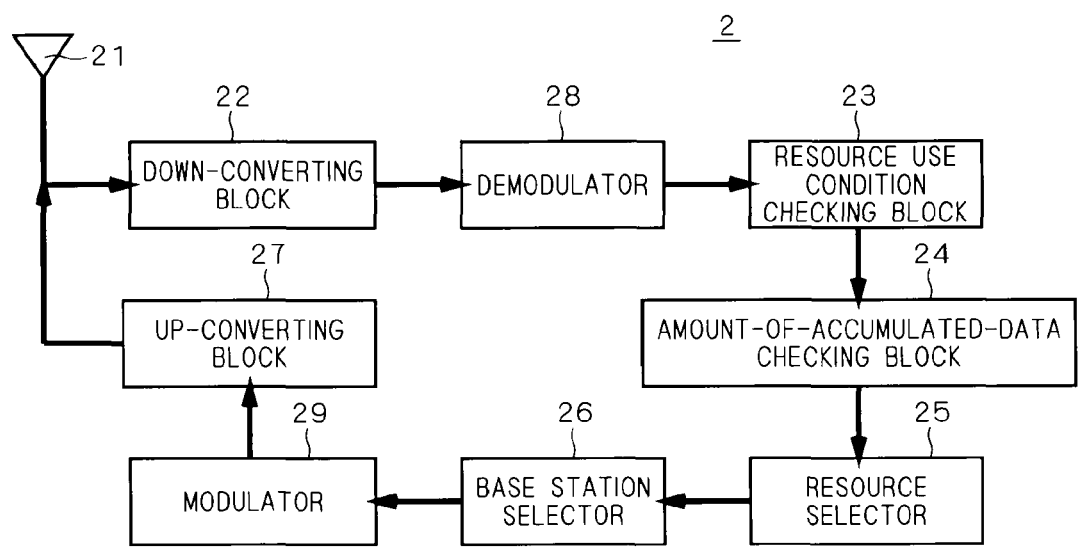
FIG. 8 A block diagram illustrating the internal configuration of a mobile station in the mobile communications system of the first preferred embodiment.

FIG. 8 is a block diagram illustrating the internal configuration of the mobile station 2 of the mobile communications system of the first preferred embodiment.

An antenna block 21 performs transmission/reception to and from external equipment like base stations. A down-converting block 22 down-converts the RF signal received at the antenna block 21 into baseband. A resource use condition checking block 23 makes judgments on the basis of the resource use information IR in the resource-related information RJ.

An amount-of-accumulated-data checking block 24 analyzes the accumulation information ID in the resource-related information RJ, to know the amount of accumulated data for each resource number in the accumulation information ID. A resource selector 25 selects radio resource candidates that the mobile station desires to use. From among the radio resource candidates, a base station selector 26 finally selects a radio resource and a base station that the mobile station 2 uses. That is, in the mobile communications system of the first preferred embodiment, the mobile station 2 side can select base stations. In this way, the components 21 to 26 have a resource determining function of determining resources to be used on the basis of the resource-related information RJ.

An amp-converting block 27 up-converts data about resource specifying information from the mobile station 2 to the base stations, from a baseband signal to an RF signal. A demodulator 28 demodulates received channels. A modulator 29 modulates data to be transmitted. In this way, with the resources to be used determined by the resource determining function, the components 27 to 29 constitute a resource specifying function of specifying the resources for use to the base stations.

The number of branch(es) of the antenna block 21 is not always "1". When the number of branches of the antenna block 21 is "2", for example, the structure of FIG. 8 is configured as shown below. Two down-converting blocks 22 and two up-converting blocks 27 are provided in correspondence with the number of branches. The demodulator 28 collects pieces of information received at respective branches, and then only the information received at a branch with better receiving sensitivity may be used, or the information may be synthesized with weights. The resource use condition checking block 23, the amount-of-accumulated-data checking block 24, the resource selector 25, and the base station selector 26 are each provided as one unit as shown in FIG. 8. Then, the modulator 29 may select a branch or assign weights, and the information is sent to the up-converting block 27.

When the antenna block 21 of the mobile station 2 receives resource-related information RJ on a broadcast channel, the down-converting block 22 down-converts it and converts it to a baseband signal. The demodulator 28 demodulates the converted data, and the resource use condition checking block 23 checks the contents of the resource use information IR in the resource-related information RJ. When pieces of information are received on different broadcast channels from multiple base stations, and CDMA is adopted in which information is multiplexed by multiplication with different spread codes, it is possible to identify the broadcast channels from the individual base stations by using the spread codes corresponding to the respective base stations. In the case of OFDM, the broadcast channels from the base stations can be identified through the assignment of different subchannels to different base stations. In the case of TDMA, the mobile station handles time slots unique to the base stations as known information, and it can identify which time slots correspond to which base stations' broadcast channels. Thus, with the base stations identified, the demodulator 28 demodulates the resource-related information RJ on the broadcast channels.

In the mobile station 2, the resource use condition checking block 23 obtains information about unoccupied resources and occupied resources from the resource use information IR. After that, the resource-related information RJ is given to the amount-of-accumulated-data checking block 24, where the accumulation information ID in the resource-related information RJ is analyzed. The amount-of-accumulated-data checking block 24 checks the accumulation level for each resource number, and the mobile station 2 can approximately recognize the amounts of accumulated data in kbyte (see the associations in FIG. 5).

With the results obtained in the resource use condition checking block 23 and the amount-of-accumulated-data checking block 24, the resource selector 25 selects candidates for radio resources to be used. On the basis of a resource that has been judged to have the largest amount of accumulated data by the amount-of-accumulated-data checking block 24, some resources that are located close to the resource number of the largest amount of accumulated data and that have relatively small amounts of accumulated data are selected as radio resource candidates.

For example, in FIG. 4, when the accumulation level (see FIG. 5) of the resource of the resource number 4 is the largest, the unoccupied resources of the resource numbers 1 and 7 that are at equal distances from the resource number 4 are selected as radio resource candidates.

After that, from among the radio resource candidates selected in the resource selector 25, a resource of the same base station as the resource judged to have the large amount of accumulated data is selected as a finally selected resource, and the base station to which the finally selected resource is assigned is selected as a selected base station from among the base stations 11 to 14 by the base station selector 26.

For example, suppose that: the resource numbers 1 to 4 are assigned to the base station 12; the resource numbers 5 to 8 are assigned to the base station 13; the accumulation level (see FIG. 5) of the resource number 4 in FIG. 4 is the largest; and the resources of the resource numbers 1 and 7 have been selected as radio resource candidates as explained above. In this case, the resource of the resource number 1, which is of the same base station 12 as the largest accumulation resource (resource number 4), is determined to be the finally selected resource, and the base station 12 having the finally selected resource (resource number 1) is determined to be the selected base station.

In this way, the resource selector 25 and the base station selector 26 are capable of managing resources to select appropriate radio resources on the basis of the resource-related information RJ including the resource use information IR and accumulation information ID.

Then, with uplink data that carries information about the resource selection to be reported from the mobile station 2 to the selected base station, the modulator 29 converts the uplink data to a format or scheme unique to the selected base station. For example, in the case of CDMA, a spread code number unique to the selected base station is assigned, and in the case of TDMA, the uplink data is assigned to a time slot unique to the selected base station.

Also, it can be achieved by a conversion to a format or scheme unique to the selected base station, by considering the fact that, in the case of single carrier FDMA in which Discrete Fourier Transform (DFT) is followed by Inverse Fast Fourier Transform (IFFT), different frequency regions are assigned to individual base stations during DFT, or, in the case of OFDM, different subcarriers are assigned to individual base stations.

The up-converting block 27 up-converts the baseband uplink data processed in the modulator 29 to provide an RF signal, and the RF signal is transmitted from the antenna block 21.

In this way, the mobile station 2 of the mobile communications system of the first preferred embodiment achieves the management of resources of the base stations 11 to 14 by thus selecting radio resources of the base stations 11 to 14.

Resources of the base stations 11 to 14 are thus specified by the mobile station 2 according to the above-described method 1, whereby the base stations 11 to 14 can eliminate the redundancy of resource control with a simple configuration. This will be described in detail.

In conventional techniques, a base station receives data from a mobile station and sends it to a high-order apparatus after conducting demodulation and message generation processing, or demodulation, channel decoding (decoding), and high-order layer frame formatting.

In contrast, in the mobile communications system of the first preferred embodiment, a base station receives data from a mobile station and returns data to the mobile station after conducting demodulation (SIR estimation (processing based on estimated SIR value (signal power/interference power))), and it just promptly feeds back information to the mobile station after demodulation without conducting processes such as messaging and channel decoding.

In this way, in the mobile communications system of the first preferred embodiment, a base station receives information from a mobile station (terminal) and returns it to the mobile station in an almost intact form, which eliminates the need for channel coding (or message generation), thus eliminating the redundancy of resource control.

Also, in the first preferred embodiment where the mobile station 2 specifies resources, it is possible to speedily use resources that are the most appropriate for the position of the mobile station 2.

FIG. 9 is a diagram illustrating an effect of the first preferred embodiment. As shown in the diagram, it is possible to control resources of the base stations 12 to 14 by using the resource specifying signals RS2 to RS4 from the mobile station 2. This eliminates the need for resource control by the base station host apparatus 1, and the base stations 11 to 14 connected to each other can communicate with the mobile station 2 just by themselves, without through the base station host apparatus 1.

Figure 10:
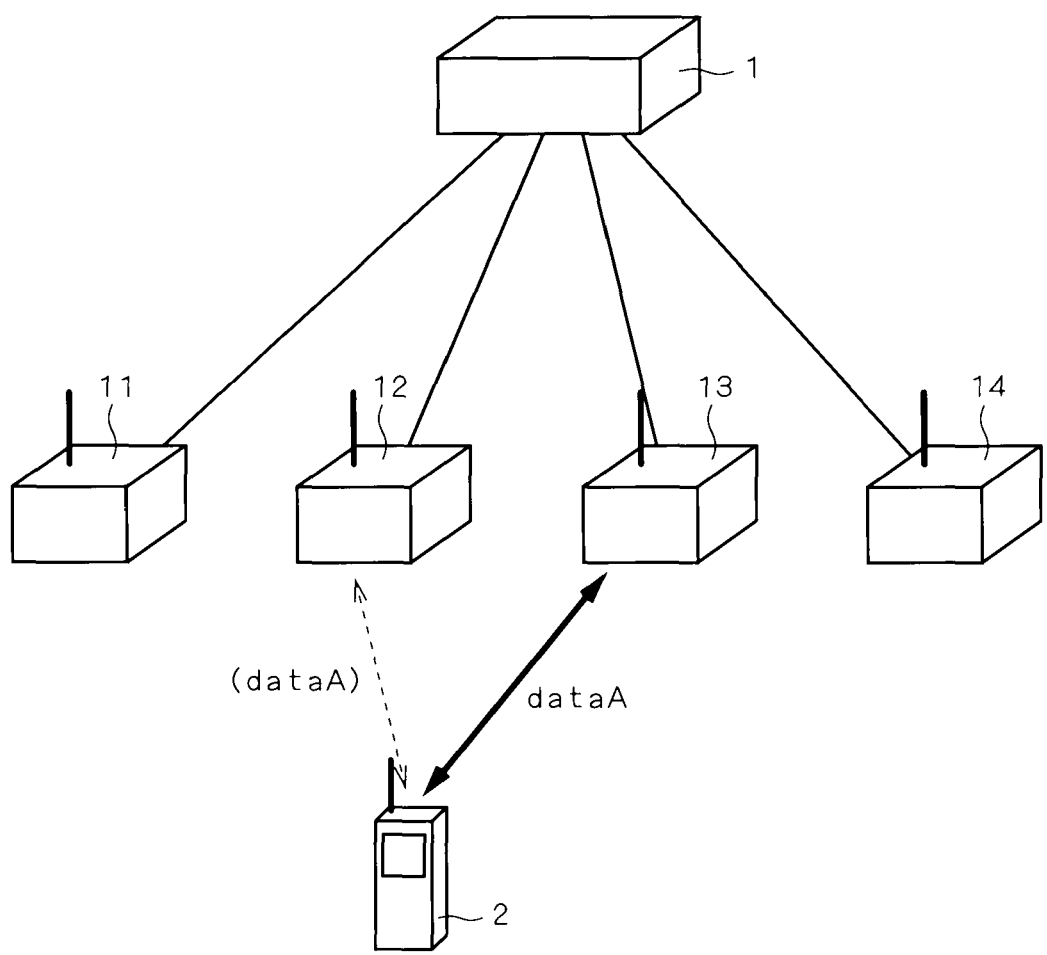
FIG. 10 A diagram illustrating an effect of the first preferred embodiment.

FIG. 10 is a diagram illustrating an effect of the first preferred embodiment. As shown in the diagram, when the base station 12 is closest to the mobile station 2 and the base station 12 does not have free resources enough, the communication with the mobile station 2 can be achieved by using resources of the adjacent base station 13.

Figure 11:
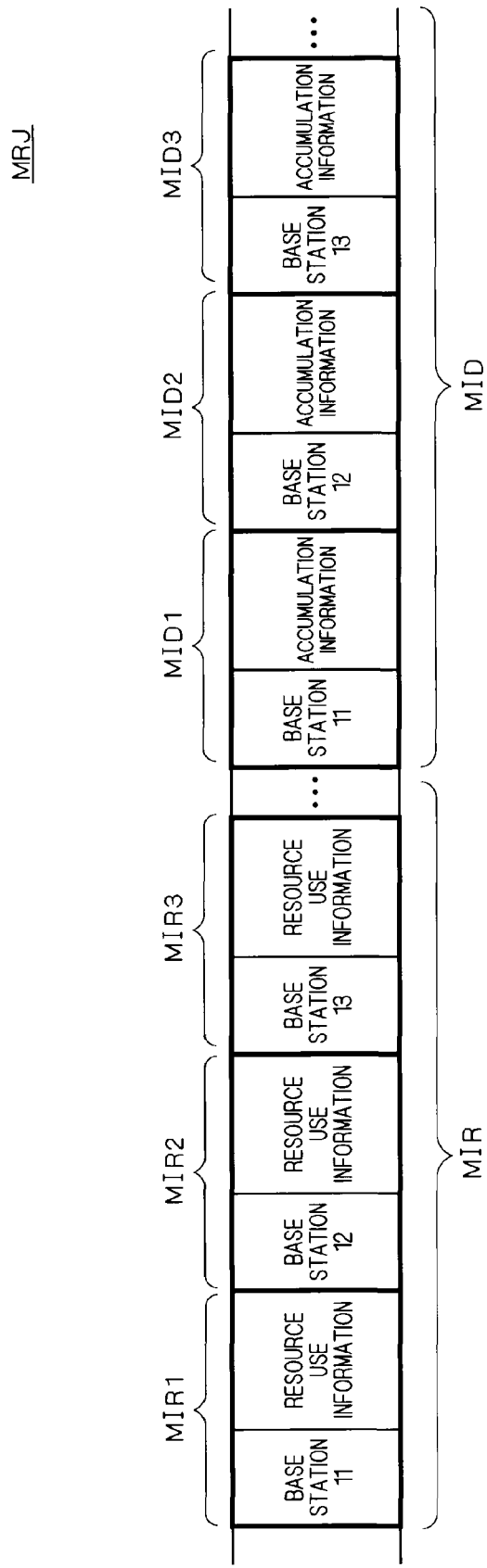
FIG. 11 A diagram illustrating the format of a broadcast channel through which a certain base station can send resource information also about adjacent base stations to a mobile station.

Next, the method 2 will be specifically described with the example shown in FIG. 11. FIG. 11 is a diagram illustrating a format of a broadcast channel with which a resource-related information reporting base station can report resource information also about adjacent base stations to a mobile station.

As shown in FIG. 11, multiple-base-station resource-related information MRJ carried on the broadcast channel of a resource-related information reporting base station includes multiple-base-station resource use information MIR and multiple-base-station accumulation information MID.

The multiple-base-station resource use information MIR is composed of base station resource use information MIR1, MIR2, MIR3, . . . , and each base station resource use information MIRi (i=1, 2, 3, . . . ) is composed of a base station number i and resource use information corresponding to the base station of the base station number i.

The multiple-base-station accumulation information MID is composed of base station accumulation information MID1, MID2, MID3, . . . , and each base station accumulation information MIDi is composed of a base station number i and accumulation information corresponding to the base station of the base station number i.

In this way, the method 2 uses multiple-base-station resource-related information MRJ composed of multiple-base-station resource use information MIR and multiple-base-station accumulation information MID, where the multiple-base-station resource use information MIR and the multiple-base-station accumulation information MID are in a relation similar to that between the resource use information IR and accumulation information ID of FIG. 3 described in the method 1.

The mobile station 2 selects resources of base stations also in a way similar to that described with FIG. 8 in the method 1.

Accordingly, in a system in which the mobile station 2 communicates by radio only with the resource-related information reporting base station and adjacent base stations, the mobile station 2 can receive the multiple-base-station resource-related information MRJ from the broadcast channel of the resource-related information reporting base station. Accordingly, in the demodulation performed in the demodulator 28 preceding the resource use condition checking block 23 of FIG. 8, it is not necessary to separate channels that are multiplexed by, e.g. CDMA, for the identification of base stations.

As for communication of data between the base stations, the base stations may regularly send/receive information such as resource use conditions and accumulation information to and from each other, or a certain base station may collect information about neighboring base stations when requested from a mobile station, or the base stations may be radio-connected to send/receive data through special channels between the radio base stations. Also, a base station host apparatus may collect information about all base stations around the mobile station, or a base station that most often communicates with the mobile station through radio resources may collect information about all base stations in the neighborhood.

The mobile communications system adopting the method 2 above has further effects as below, in addition to the effects obtained when the method 1 is adopted.

When the mobile station 2 is connected by radio communication with multiple base stations, it can obtain resource-related information about the multiple base stations through a relatively small number of broadcast channels. In the configuration shown in FIG. 1, for example, when the base station 13 is the resource-related information reporting base station and the base stations 12 and 14 are adjacent base stations, the base station 13 can communicate with the base stations 12 and 14 to obtain resource-related information about the base stations 12 to 14 and thus to obtain multiple-base-station resource-related information MRJ about the base stations 12 to 14.

In the method 1, a broadcast channel exists for each base station, and the mobile station has to identify which broadcast channels are from which base stations through multiplexing by, e.g. CDMA.

In contrast, in the method 2, it can identify resource-related information about multiple base stations with the multiple-base-station resource-related information MRJ obtained from the broadcast channel from the resource-related information reporting base station, whereby the number of multiplexing can be reduced as compared with a scheme like the method 1 in which multiple base stations each send resource-related information RJ.

Also, in a system in which the mobile station 2 communicates by radio only with the resource-related information reporting base station and base stations adjacent to the resource-related information reporting base station, it is possible for the mobile station to obtain resource-related information about all base stations with which it communicates by radio, just by receiving multiple-base-station resource-related information MRJ on a single broadcast channel from the resource-related information reporting base station. In addition, the device structure of the mobile station can be simplified.

Figure 13:
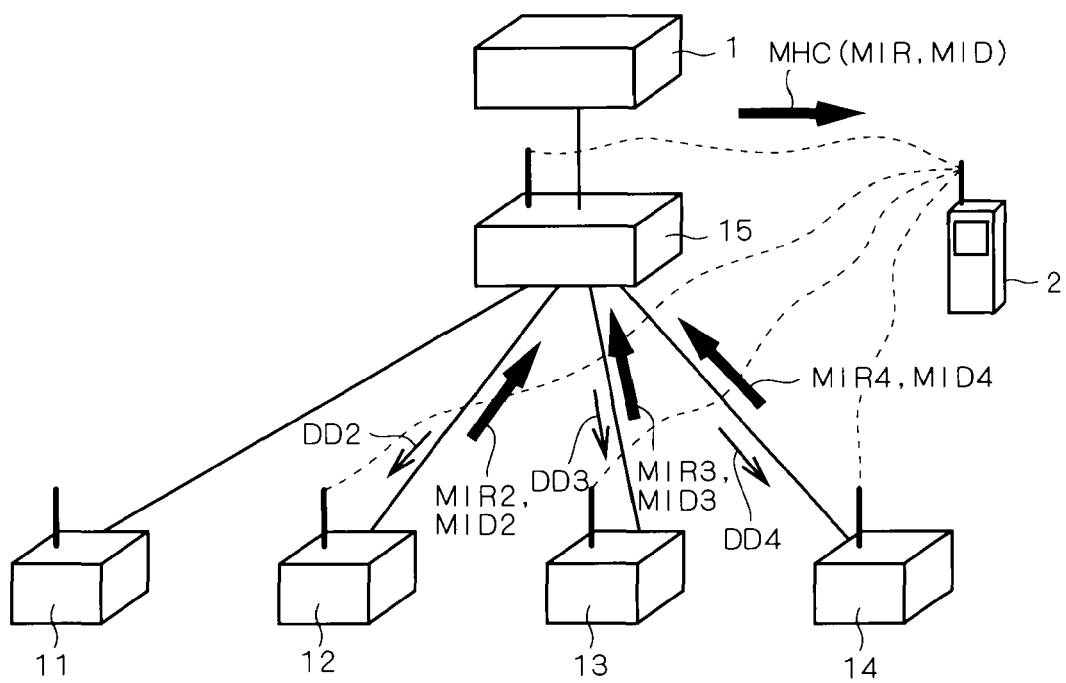
FIG. 13 A diagram illustrating how the mobile communications system of the first preferred embodiment is used when Method 3 is adopted in the first preferred embodiment.

Next, the method 3 will be specifically described with the examples shown in FIGS. 12 and 13. FIGS. 12 and 13 are diagrams illustrating how the mobile communications system of the first preferred embodiment is used when the method 3 is adopted. FIG. 12 shows a condition in which the mobile station 2 gives resource specifying signals RS2 to RS5 to the base stations 12 to 15, and FIG. 13 shows a condition in which base station resource use information MIR2 to MIR4 and base station accumulation information MID2 to MID4 about the base stations 12 to 14 are sent to the base station 15, and the base station 15 sends, to the mobile station 2, the multiple-base-station resource-related information MRJ including multiple-base-station resource use information MIR and multiple-base-station accumulation information MID.

Thus, FIGS. 12 and 13 show an example in which not the base station host apparatus 1 (e.g. see FIG. 1) but the base station 15 is connected to the base stations 11 to 14. In FIGS. 12 and 13, the base stations 11 to 14 are adjacent base stations for the base station 15.

As in the method 2, in reporting resource use information IR and accumulation information ID about the adjacent base stations 11 to 14 to the mobile station 2, the base station 15 places not only its own resource use information but also resource information about the base stations 11 to 14 on the same broadcast channel to the mobile station 2. The broadcast channel is configured by the data format shown in FIG. 11 described in the method 2, and it contains resource use information and accumulation information about the base stations 11 to 15.

However, unlike in the methods 1 and 2, the contents of the accumulation information ID are not information about data sent from the base station host apparatus 1 to the base stations 11 to 15, but the contents are information about downlink data DD2 to DD4 sent from the base station 15 to the base stations 11 to 14 as shown in FIG. 13.

Also, because the base station 15 itself can communicate by radio with the mobile station 2, communication as shown below is possible. The mobile station 2 is performing radio communication with the base station 15 and the base stations 12 to 14. When the load of data processing in the base station 15 becomes large in the radio communication with the mobile station 2, the base station 15 informs the mobile station 2 through a broadcast channel that the resources are occupied, despite the fact that resources for resource use information are not totally occupied. Also, it transfers resources to other base station, e.g. the base station 13, so that the processing load does not exceed a threshold. This can be achieved by defining a threshold and setting so that resources are automatically transferred. Before transferring, the base station 15 changes the accumulation information about the base station 13 in the multiple-base-station resource-related information MRJ on the broadcast channel to raise the level of the amounts of accumulated data for unoccupied resources of the base station 13.

As a result, the mobile station 2 does not assign new resources to the base station 15, but it attempts to assign resources to the base station 13. This enables control of resources including adjustment of the base stations' processing loads.

The mobile communications system of the first preferred embodiment offers the effects below by adopting the method 3.

The base station 15 governs the base stations 11 to 14 as subordinates, and the subordinate base stations 11 to 14 and the base station 15 can exchange data. The base station 15 can hold information in the base stations 11 to 14 together. This base station 15 itself communicates with the mobile station 2, whereby optimum data transmission can be achieved by also considering the transmission paths between the base station 15 and the base stations 11 to 14.

The base station 15 can collect information about transmission delays between the base station 15 and base station 11, between the base station 15 and base station 12, between the base station 15 and base station 13, and between the base station 15 and base station 14; when the transmission delay is small between the base station 15 and base station 13, it can give high priority to the path through the base station 13, the base station 15 and the mobile station 2, so as to suppress the transmission delay of the system.

On the other hand, when the delay between the base station 15 and base station 14 is large, the base station 15 can suppress transmission delay small by assigning as many resources as possible between the base station 15 and the mobile station 2 (the path from the base station 15 directly to the mobile station 2) without transmitting data to the base station 14 (in the case of uplink, without via the base station 14 in communication from the mobile station 2 to the base station 15).

It is necessary to consider such transmission delays because fluctuations are large when the base station 15 and base stations 11 to 14 are connected through an IP network, and transmission delay can be suppressed by adopting the method 3 since transmission routes can be considered as explained above during data transmission.

Also, the base stations 11 to 14 can be used as auxiliary base stations, like co-processors of the base station 15. That is, while communication with the mobile station 2 is performed only by the base station 15 under normal conditions, the load on the base station 15 can be reduced by utilizing the base stations 11 to 14 when the load is too much for the base station 15 alone.

The method 4 provides another scheme by which the mobile station 2 specifies resources of the base stations 12 to 14 in the mobile communications system shown in FIG. 1, for example, where the mobile station 2 specifies resources of the base stations 12 to 14 in such a way as to minimize the transmission power of the base stations 12 to 14. The method 4 will be specifically described with the example of FIG. 1.

From the base stations 12 to 14 being in communication, the mobile station 2 receives information about transmission power for transmissions from the base stations 12 to 14 to the mobile station 2; on the basis of the information about transmission power, the mobile station 2 reduces the number of resources assigned to the base station 14 whose transmission power is the largest, and increases the number of resources assigned to a base station (e.g. the base station 13) whose transmission power is the smallest, whereby the total transmission power for transmissions from the base stations 12 to 14 to the mobile station 2 is minimized.

As for a method by which the mobile station 2 learns transmission powers of the base stations 12 to 14, the base stations 12 to 14 may inform the mobile station 2 through common channels separate from data channels, like the broadcast channels used in the method 1, for example. Alternatively, the transmission power for base station transmission may be carried as information in data transmitted from the base stations 12 to 14 to the mobile station 2, and the mobile station 2 measures the received power and thus measures loss (propagation loss) of power through the radio propagation. For the propagation loss, for example, the base stations 12 to 14 transmit downlink data with a power of −10 dBm, and put that information in data to report it to the mobile station 2. At reception, the mobile station 2 measures the received power, and the propagation loss is 60 dB when the power is −70 dBm.

For another method by which the mobile station 2 learns transmission power of the base stations 12 to 14, instead of being directly informed of the values of transmission power or measuring received power, there is a method that minimizes the transmission power by utilizing the fact that the transmission power is smaller when the distances between the base stations 12 to 14 and the mobile station 2 are shorter. The distances between the mobile station 2 and the base stations 12 to 14 are measured in terms of the amounts of delay of the arrival times of paths. The paths for downlink data are detected, and the distances between the base stations 12 to 14 and the mobile station 2 are estimated from the delay times of the paths. The estimating method will be described in detail below.

Figure 14:
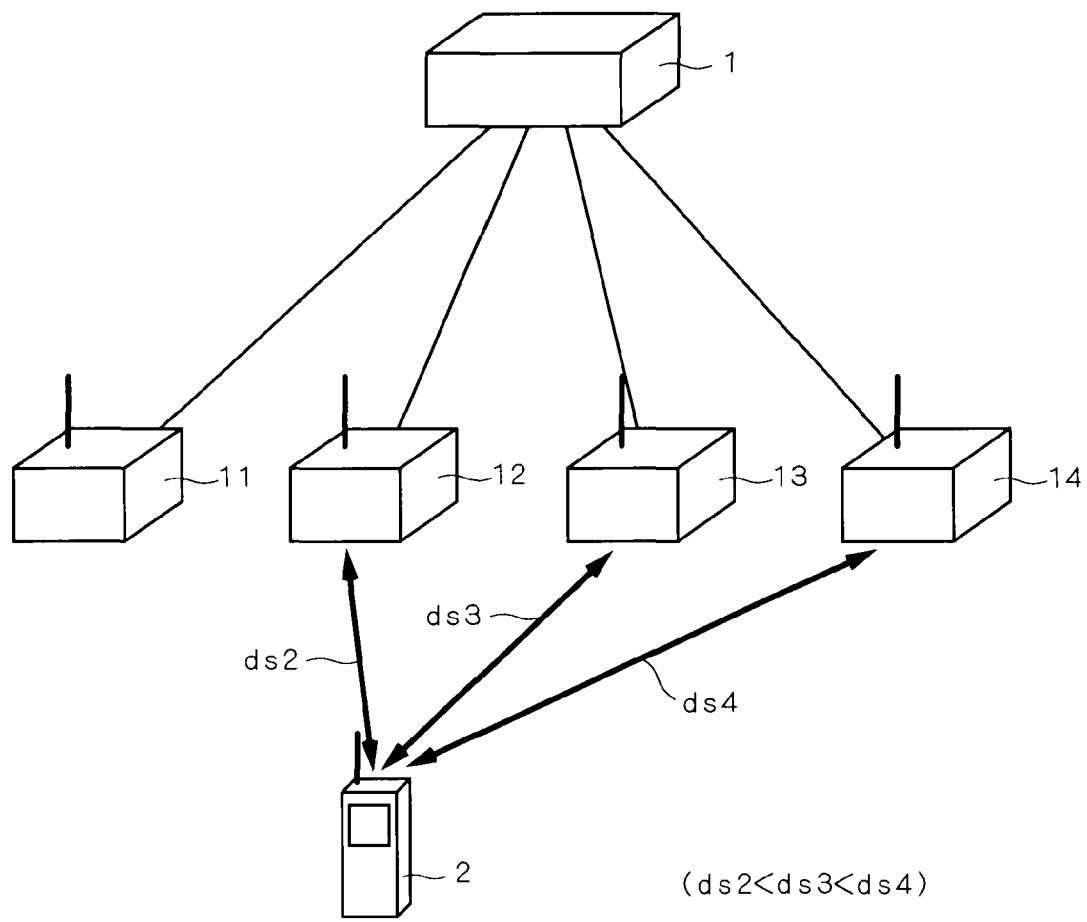
FIG. 14 A diagram illustrating a method for estimating distances between a mobile station and base stations.

FIG. 14 is a diagram illustrating a method for estimating the distances between the mobile station 2 and the base stations 12 to 14. As shown in FIG. 14, it is assumed that the mobile station 2 can connect simultaneously with the three base stations 12 to 14. On the basis of information about the delays on the paths, the mobile station 2 adds resources sequentially from the base station whose propagation distance is the shortest among the wave propagation distances between the mobile station 2 and the base stations 12 to 14.

The broadcast channels can be of any of the formats of the methods 1 to 3, and the mobile station 2 assigns resources to unoccupied resources while setting priorities so that the transmission power of the base stations can be minimized. For the path delay information, in the case of W-CDMA, for example, the propagation distances can be known with a resolution of about a chip rate of 3.84 MHz or about 7-15 MHz with over-sampling of 2 to 4 times. Waves in mobile communication seldom arrive directly; therefore, among the arrival paths from base stations, the mobile station checks the delays of the positions where paths with the largest power are detected, and regards a base station with a small delay as a base station with a short propagation distance.

Figure 15:
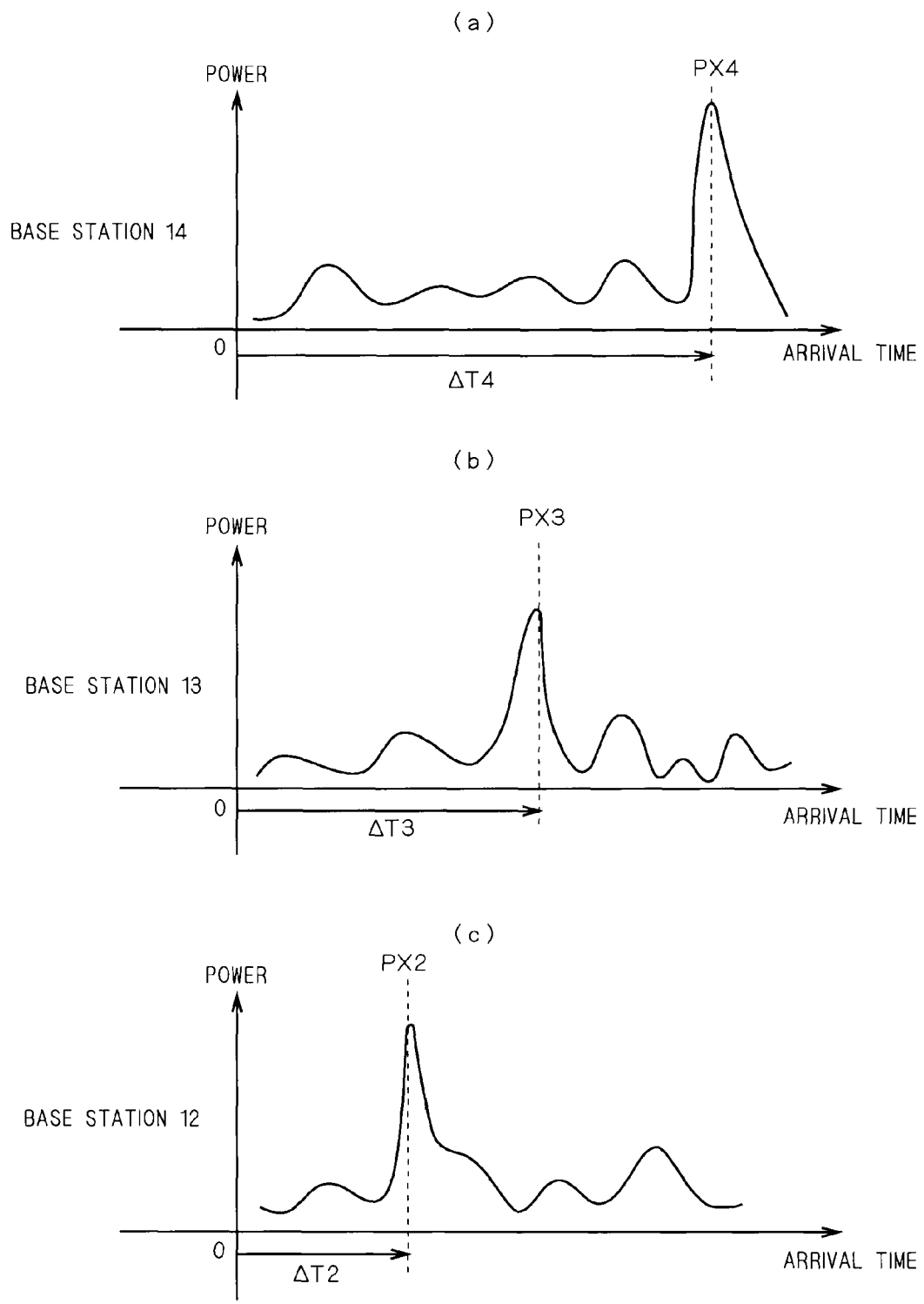
FIG. 15 Graphs illustrating a relation between the propagation distance and the time of propagation delay of a wave arriving from a base station to a mobile station.

FIG. 15 shows graphs indicating a relation between the propagation distances and the times of propagation delay $\Delta T2$ to $\Delta T4$ of waves arriving from the base stations 12 to 14 to the mobile station 2.

As shown in the diagrams (a) to (c), the propagation delay times $\Delta T2$ to $\Delta T4$ until which the peaks PX2 to PX4 of received power of the base stations 12 to 14 are detected are in a relation of $\Delta T2$ (diagram (c))$<\Delta T3$ (diagram (b))$<\Delta T4$ (diagram (a)). Accordingly, as shown in FIG. 14, the distances ds2 to ds4 between the mobile station 2 and the base stations 12 to 14 are estimated to satisfy the relation ds2$<$ds3$<$ds4.

The mobile station 2 assigns additional resources to the base stations 12 to 14 on the basis of ds2 to ds4 between the mobile station 2 and the base stations 12 to 14 that have been recognized by the estimating method above. When the base station estimated to have the shortest propagation distance has no unoccupied resources, additional resources can be assigned to the base station estimated to have the next shortest propagation delay. In the example of FIG. 14, when the resources of the base station 12 are occupied, resources are assigned to the base station 13.

The mobile communications system of the first preferred embodiment can reduce running costs of the mobile communications system by adopting the method 4. However, it should be noted that at least one radio resource exists between the mobile station and each radio-communicable base station, in order to maintain simultaneous communication between the mobile station and multiple base stations. This is because of the reason below.

To provide control to minimize transmission power, one method is to concentrate all resources to the base station that has good line quality and is the closest to the mobile station; however, in this case, when the mobile station moves and the communication with the good-line-quality base station deteriorates, switching the communication to another base station requires control to establish a connection to a base station that has no connection at all.

Accordingly, as mentioned above, at least one radio resource is held between the mobile station and each radio-communicable base station, and one mobile station maintains simultaneous connections with multiple base stations, which provides flexibility such that, when the line with a certain base station is instantaneously disconnected, the number of resources of another connected base station can be quickly increased. Also, control can be transferred easily. Furthermore, constantly recognizing QoS (quality information) of each of multiple base stations makes it possible to quickly increase or decrease the numbers of resources of other base stations.

In this way, when the method 4 is adopted, it is necessary to keep connection with one or more resources of each of connectable base stations other than the base station that uses a maximum number of resources to minimize transmission power.

The system can be controlled to minimize power while giving priority to throughput. Parameters required to enhance throughput include resource use conditions, data accumulation information, etc. described in the method 1; for example, when a higher priority is given to keeping the amounts of accumulated data small than to minimizing power, the mobile station can provide control to make downlink transmission power of the base stations as small as possible while keeping high throughput. It is also possible, by applying the method 4, to minimize transmission power of the mobile station to the base stations, and the same effects are obtained.

Next, the method 5 will be specifically described with the example of FIG. 16. FIG. 16 is a diagram illustrating how the mobile communications system of the first preferred embodiment is used when the method 5 is adopted.

While the method 1 allows the mobile station to selectively control radio resources of multiple base stations, the method 5 considers that the mobile station transmits different data respectively to multiple base stations.

FIG. 16 shows a mobile communications system in which a mobile station 4 can communicate simultaneously with a plurality of base stations 31 to 34, where the mobile station 4 sends/receives different data with base stations 31 to 34. A base station host apparatus 3 is connected to the base stations 31 to 34, and the connections with the base stations can be radio or wired. The base stations 31 to 34 can communicate with the mobile station 4 through radio transmission.

Next, the operation of the mobile communications system of the first preferred embodiment adopting the method 5 will be described. In FIG. 16, the mobile station 4 is communicating simultaneously with the base stations 32 and 33. In this situation, the mobile station 4 is sending/receiving different data respectively with the base stations 32 and 33. That is, the mobile station 4 sends data B to the base station 32, and sends data A, different from the data B, to the base station 33.

FIG. 17 is a diagram illustrating part of the internal configuration of the mobile station 4. This corresponds to the configuration in the modulator 29 shown in FIG. 8. Now, referring to FIG. 17, a method for sending/receiving different data will be described in which the mobile station 4 performs radio transmission by OFDM in data transmissions from the mobile station 4 to the base stations 32 and 33.

In the configuration shown in FIG. 16, the base stations 31 to 34 have common subcarriers SC0 to SC8.

Then, as shown in FIG. 17, the subcarriers SC0 to SC8 are radio resources for use that have been finally selected by the resource selector 25 and the base station selector 26. Also, the subcarriers SC0 to SC2 and the subcarriers SC3 to SC4 have been finally selected by the base station selector 26 as resources respectively for the base station 33 and the base station 32. FIG. 17 also shows subcarriers SC5 to SC8 assigned for data C to another base station.

In the configuration shown in FIG. 17, a serial-parallel converter 41 receives data to be transmitted D0, D1, . . . , D8, . . . and applies serial-parallel conversion to each of the subcarriers SC0 to SC8, so as to obtain transmitted data D0 to D8. An IFFT block 42 conducts inverse fast Fourier transform on the basis of the contents selected by the base station selector 26, and assigns the data D0 to D8 to the subcarriers SC0 to SC8.

In this way, data to be transmitted is divided into transmitted data pieces D0 to D8 corresponding to the multiple subcarriers SC0 to SC8, and data A is made data D0 to D2 and data B is made data D3 and D4 and assigned for transmissions to the base station 33 and the base station 32.

Then, the data is parallel-serial converted in the parallel-serial converter 43, and transmitted from the antenna block 44 (which corresponds to the antenna block 21 of FIG. 8). Thus, the serial-parallel converter 41 has a data dividing function, and the IFFT block 42, parallel-serial converter 43, and antenna block 44 have a data transmitting function of assigning multiple divided data pieces to multiple resources and transmitting them.

As shown in FIG. 17, data A can be sent to the base station 33 by using the subcarriers SC0 to SC2 for the transmission of data A (D0 to D2). Also, data B can be sent to the base station 32 by using the subcarriers SC3 to SC4 for the transmission of data B (D3, D4), which are not used for the transmission of data A.

As a result, by adopting the method 5, the mobile communications system of the first preferred embodiment can transmit different data A and data B to different base stations 33 and 32.

On the other hand, in transmissions from the base stations 32 and 33 to the mobile station 4, when the base stations 32 and 33 adopt single-carrier transmission, the base stations 32 and 33 transmit their respective data to the mobile station 4, and the mobile station 4 can receive the data transmitted from the base station 32 on the subcarriers SC0 to SC2, and receive the data transmitted from the base station 33 on the subcarriers SC3 to SC4, by multi-carrier transmission such as OFDM.

Figure 18:
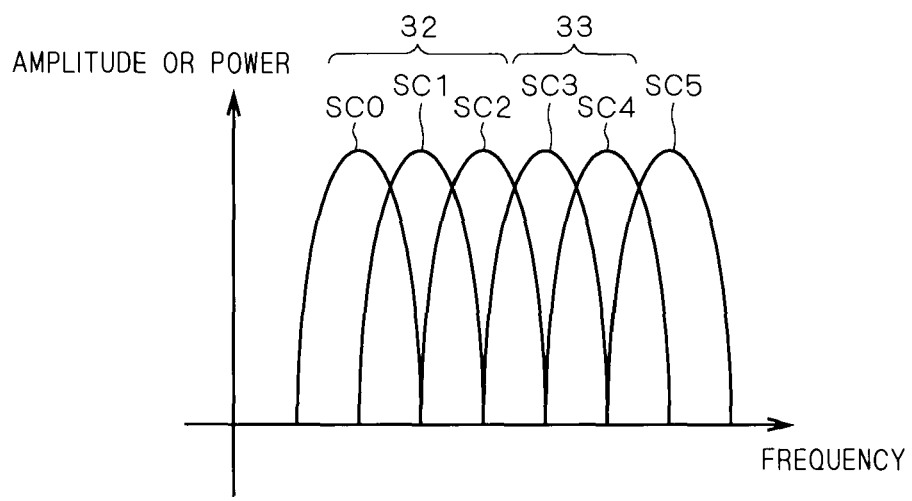
FIG. 18 A graph illustrating a subcarrier beam pattern.

FIG. 18 is a graph showing a subcarrier beam pattern. As shown in the diagram, the mobile station 4 uses the subcarriers SC0 to SC2 for the reception of data from the base station 32, and uses the subcarriers SC3 to SC4 for the reception of data from the base station 33, whereby the data can be received independently from the base stations 32 and 33.

As a result, larger amounts of data can be transmitted as compared with when same data is sent/received between the mobile station 2 and the base stations 32 and 33.

Also, it is possible to divide one data system into multiple data pieces and send them to different base stations.

For example, suppose that only the transmission path between the mobile station 4 and the base station 32 is poor and data cannot be communicated successfully, and the mobile station 4 receives a request for retransmission from the base station 32; then, the mobile station 4 can transmit the data to be sent to the base station 32 not directly to the base station 32 but via the base station 33. Data to be sent to the base station 33 has already been successfully transmitted, and so there is no need to retransmit the entire data system but the divided half of the data system is retransmitted, whereby the retransmission of data can be made by radio at high speed.

Second Preferred Embodiment

Figure 19:
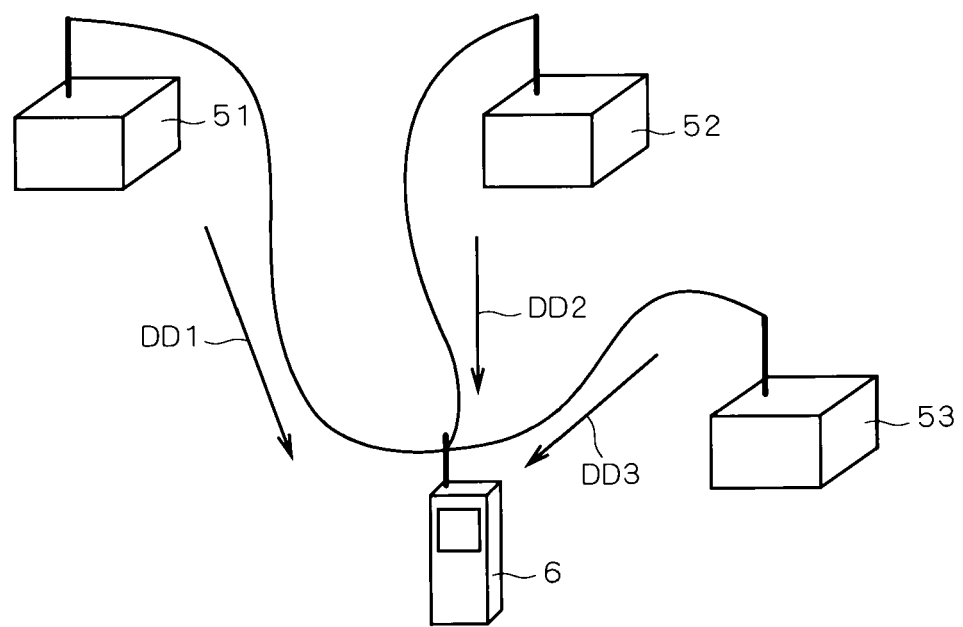
FIG. 19 A diagram illustrating how communication is performed in a mobile communications system according to a second preferred embodiment of the present invention.

FIG. 19 is a diagram illustrating a condition of communication in a mobile communications system according to a second preferred embodiment of the present invention. In the mobile communications system shown in the diagram, a mobile station 6 is capable of communicating by radio simultaneously with a plurality of base stations 51 to 53.

The mobile communications system of the second preferred embodiment differs from that of the first preferred embodiment in that a response including resource-related information RJ is sent back in response to a request from a mobile station, without using broadcast information using broadcast channels. That is, when a base station receives a request from one mobile station for the conditions of resources etc. (resource request), it then sends resource-related information including the conditions of resources etc. as a response back to the one mobile station (resource response). Each base station thus gives a resource response to each mobile station issuing a resource request.

In the example of FIG. 19, the base stations 51 to 53 are attempting to respectively transmit downlink data DD1 to DD3 to the mobile station 6.

FIG. 20 is a diagram illustrating a procedure by which the mobile station 6 determines transmission rates for the downlink data DD1 to DD3. The contents of the procedure for determining transmission rates will be described referring to the diagram.

First, in Step ST1, the mobile station 6 makes requests to three base stations 51 to 53, with which it decided to make communication, for downlink data at the respective maximum transmission rates (200 kbps) of the base stations 51 to 53. For example, when the mobile station 6 requests the base stations 51 to 53 to perform multi-carrier transmissions, the maximum transmission rates can be realized by, in Step ST1, requesting the individual base stations 51 to 53 to assign maximum numbers of subcarriers (the number is assumed to be 10 herein).

Then, in Step ST2, in response to the requests in Step ST1, the base stations 51 to 53 respectively send resource-related information to the mobile station 6. The resource-related information includes: (1) resource use information, such as the conditions of congestion of resources; (2) the conditions of transmission paths (the conditions of transmission distortion); (3) the distance between the base and mobile stations; (4) accumulation information, and the like.

After that, in Step ST3, on the basis of the resource-related information sent from the base stations 51 to 53, the mobile station 6 changes the transmission rates for the base stations 51 to 53 from the values in Step ST1, to finally determine the transmission rates.

For example, suppose that the mobile station 6 requested the assignment of 10 subcarriers in Step ST1 and the mobile station 6 determined the ratio of transmission rates (the ratio among the amounts of data) as (base station 51):(base station 52):(base station 53)=3:2:5.

In this case, the mobile station 6 updates the number of subcarriers assigned to the base station 51 to "3", the number of subcarriers assigned to the base station 52 to "2", and the number of subcarriers assigned to the base station 53 to "5". As a result, transmission rates of 60, 40 and 100 (kbps) are requested as finally requested transmission rates of the downlink data DD1 to DD3 respectively from the base stations 51 to 53.

When the base stations 51 to 53 adopt single-carrier transmission, the transmission rates can be changed by using adaptive modulation, or using a scheme applying DFT and then IFFT and increasing/decreasing the number of sample points of DFT. This example has described transmission of downlink data from the base stations 51 to 53 to the mobile station 6, but the same is true also for uplink transmission from the mobile station 6 to the base stations 51 to 53.

Now, the procedure of determining transmission rates according to the second preferred embodiment will be specifically described. In the second preferred embodiment, not only radio resource control under the initiative of the mobile station 6 but also radio resource control under the initiative of the network side is possible. That is, the entire control made by the mobile station 6 can be performed by a high-order apparatus corresponding to the base station host apparatus 1 (see FIG. 1). First, the radio resource control under the initiative of the mobile station will be described.

FIG. 21 is a diagram illustrating how the mobile communications system of the second preferred embodiment is used. In FIG. 21, the mobile station 6 attempts to connect to the multiple base stations 51 and 53 at the maximum transmission rates. Seen from the base stations 51 to 53, they receive requests from the mobile station 6 for transmissions at the maximum transmission rates (see Step ST1 of FIG. 20).

In response, the base stations 51 to 53 respectively send to the mobile station 6 resource-related information including the conditions of use of radio resources and accumulation information (see Step ST2 of FIG. 20). The resource-related information is sent by using radio resources that are used for radio communication with the mobile station 6.

Initially (in Step ST1 of FIG. 20), the mobile station 6 requests the maximum downlink transmission rates from the base stations 51 to 53, to reserve the maximum numbers of radio resources of the base stations 51 to 53. It is thus possible to freely select optimum resources by choosing and using necessary resources from among the reserved radio resources, whereby the control of resources is facilitated than when the resources corresponding to the final transmission rates are ensured directly from unoccupied resources.

After the mobile station 6 has received the resource-related information from the base stations 51 to 53, including their respective resource use conditions and the amounts of accumulated data, it sends final transmission rate requests RD1 to RD3 to the base stations 51 to 53 (see Step ST3 of FIG. 20), where the values of downlink data transmission rates for transmissions from the base stations 51 to 53 have been changed.

Instead of the reception of resource-related information mainly including resource use conditions and amounts of accumulated data, the mobile station 6 may determine the transmission rates of downlink data on the basis of the measurements of distortion, where the base stations 51 to 53 measure the conditions of distortion of transmission paths of downlink data sent to the mobile station 6, and send resource-related information mainly including the measured conditions of distortion to the mobile station 6. Also, the mobile station 6 may determine the downlink data transmission rates by also utilizing the measurements of distortion on the transmission paths in addition to the information about the resource use conditions and amount of accumulated data.

In this case, there is an advantage that, since the base stations 51 to 53 initially ensure maximum resources, the mobile station 6 can be informed of and recognize the measurements of transmission path distortions about the maximum numbers of resources respectively from the base stations 51 to 53 (which are measurements of distortions on uplink transmission paths from the mobile station 6 to the base stations 51 to 53, and which are measured by the base stations 51 to 53).

FIG. 22 is a block diagram illustrating the internal configuration of the mobile station 6 of the mobile communications system of the second preferred embodiment. As shown in the diagram, the mobile station 6 includes an antenna block 61, a down-converting block 62, a resource use condition checking block 63, a transmission path condition checking block 64, an amounts-of-data assigning block 65, an up-converting block 66, a demodulator 67, and a modulator 68.

The antenna block 61 is shown as having one branch for the sake of simplification, but it may have multiple branches. The down-converting block 62 converts an RF signal received at the antenna block 61 into a baseband signal.

The resource use condition checking block 63 checks the conditions of use of radio resources of the base stations that are contained in the resource-related information etc. from the base stations. The transmission path condition checking block 64 checks the conditions of data transmission paths from the radio resources of the base stations that are used for new radio communication of the mobile station.

The amounts-of-data assigning block 65 determines the values of downlink data transmission rates from the base stations. The assignment of the amounts of data made by the amounts-of-data assigning block 65 means the ratio among the amounts of data when the mobile station 6 sends the same data to multiple base stations in a divided form, or when the base stations send the same data to the mobile station in a divided form.

When the mobile station 6 sends/receives different data to and from multiple base stations, the amounts-of-data assigning block 65 simply determines the value of transmission rate for each base station.

The up-converting block 66 converts a baseband signal to an RF signal. The demodulator 67 demodulates received channels. The modulator 68 modulates data to be transmitted.

The mobile station 6 thus configured sends downlink data transmission rate requests (initial transmission rate requests) respectively to the base stations 51 to 53. At this time, the mobile station 5 does not yet know any of the resource use conditions, the amounts of accumulated data, and the conditions of transmission paths of the base stations 51 to 53, and so the amounts-of-data assigning block 65 sends requests for maximum transmission rates respectively to the base stations 51 to 53 (Step ST1 of FIG. 20).

In response thereto, the base stations 51 to 53 send to the mobile station 6 the resource-related information mainly including their own resource use conditions and amounts of accumulated data by using unoccupied resources (Step ST2 of FIG. 20). In this process, data channels of minimum transmission rates may be used, or special channels for sending the resource use conditions and amounts of accumulated data may be used.

When the mobile station 6 receives the resource-related information mainly containing resource use conditions and amounts of accumulated data respectively from the base stations 51 to 53, the RF signals received at the antenna block 61 are converted into a baseband signal in the down-converting block 62, the contents of the resource-related information are demodulated in the demodulator 67, and the resource use conditions are checked in the resource use condition checking block 63.

The information format of the resource use condition in the resource-related information can be like that of the resource-related information RJ described with FIGS. 3 to 5. In the process of demodulating the downlink data DD1 to DD3 respectively from the base stations 51 to 53, the degrees of distortion on the signal transmission paths are measured. The degrees of distortion are measured by using a known signal system that the mobile station 6 and the base stations 51 to 53 all know. How much the phase, amplitude are shifted with respect to the known signal system is obtained, and the degrees of shift are measured as the degrees of distortion. SIR may be calculated in place of checking the conditions of transmission paths. This is also calculated by utilizing a known signal system.

FIG. 23 is a diagram illustrating a criterion in tabular form for determining transmission rates from the resource use conditions and transmission path conditions (the degrees of distortion). As shown in the diagram, the mobile station 6 determines the transmission rates for the base stations 51 to 53 on the basis of the conditions of communicating resources and the conditions of transmission paths of the individual resources defined by resource numbers.

FIG. 23 shows an example in which the base station 51 uses the resources of resource numbers 0 to 3, the base station 52 uses the resources of resource numbers 4 to 7, and the base station 53 uses the resources of resource numbers 8 to 11. The transmission path condition checking block 64 of the mobile station 6 finally determines the transmission rates for the base stations 51 to 53 on the basis of the conditions of occupancy of resources of the base stations 51 to 53 and the conditions of the transmission paths.

In the example shown in FIG. 23, the base station 53 has two unoccupied resources (resource numbers 8 and 10), and the transmission paths of the other two resources (resource numbers 9 and 11) are in good condition, and so the transmission rate of the base station 53 is determined to be 100 kbps. The base station 51 has one unoccupied resource (resource number 3), and the transmission paths of the other three resources (resource numbers 0 to 3) are in relatively bad condition, and so the transmission rate of the base station 51 is determined to be 60 kbps. The base station 52 has one unoccupied resource (resource number 6), and the transmission paths of the other three resources (resource numbers 4, 5 and 7) are in nearly the worst condition, and so the transmission rate of the base station 52 is determined to be 40 kbps.

Alternatively, estimated values of SIR may be used in place of the conditions of transmission paths as shown in FIG. 23, in which case the estimated values of SIR are classified into levels, and transmission paths having large SIR values are similarly judged to be in good condition, and ones having low estimated SIR values are similarly judged to be in bad condition.

Figure 24:
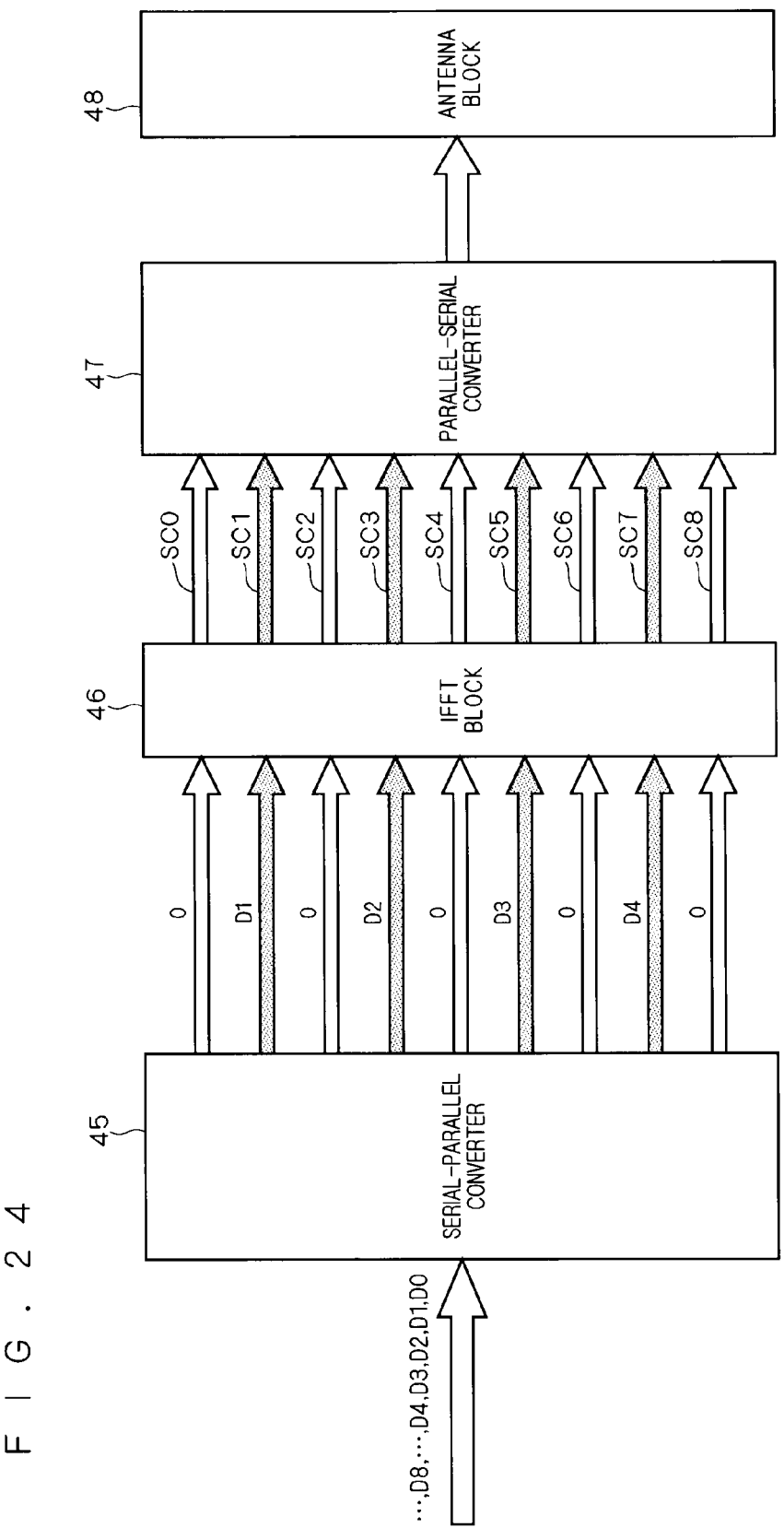
FIG. 24 A diagram illustrating part of the internal configuration of a base station in the mobile communications system of the second preferred embodiment.

FIG. 24 is a diagram illustrating part of the internal configuration of the base station 51 (52, 53). The diagram corresponds to the configuration of the modulator. Now, referring to FIG. 24, a method will be described in which the base station 51 increases/decreases the transmission rate of downlink transmission data under the control from the mobile station 6.

As shown in FIG. 24, when the base station 51 sends downlink data to the mobile station 6 according to OFDM, the base station 51 has subcarriers SC0 to SC8 corresponding to the resources of resource numbers 0 to 3.

When the transmission rate utilizing all subcarriers SC0 to SC8 is 200 kbps, and with the transmission data D0, D1, . . . , D9, . . . received from the serial-parallel converter 45, for example, the transmission data D1 to D4 are carried only on the subcarriers SC1, SC3, SC5 and SC7 obtained by fast Fourier transform in the IFFT block 46, and no transmission data is carried on the subcarriers SC0, SC2, SC4, SC6 and SC8. Then, the transmission rate can be set small around 60 kbps as shown in FIG. 23 by setting small the amount of data per unit time sent from the parallel-serial converter 47 to the antenna block 48.

In this way, with the subcarriers SC0 to SC8, the IFFT block 46 varies the amount of subcarriers on which transmission data is carried, whereby the transmission rate can be increased and decreased.

Referring to FIG. 22 again, after the transmission path condition checking block 64 has checked the transmission path conditions as described above, the amounts of data are determined by the amounts-of-data assigning block 65 as described above, and the information is modulated in the modulator 68, converted to an RF signal in the up-converting block 66, and sent to the base stations from the antenna block 61.

In this way, in the mobile communications system of the second preferred embodiment, under the control by the mobile station 6, transmission requests are sent to the base stations initially for the maximum transmission rates, and then the transmission rates are decreased to request final transmission rates. That is, the mobile station 6 initially ensures maximum resources, and then decreases the resources in correspondence with the finally determined transmission rates (finally selected resources), and thus the resources can be controlled easily. The same effect is obtained also when uplink transmissions from the mobile station 6 to the base stations 51 to 53 are conducted in the same way.

Next, the control of radio resources that is performed under the initiative of the network side will be described. FIG. 25 is a diagram illustrating how the mobile communications system of the second preferred embodiment is used.

As shown in FIG. 25, a single base station host apparatus 5 is connected to base stations 51 to 53, to enable network control. Before the base stations 51 to 53 communicate data with the mobile station 6, they receive a common channel for data communication from the mobile station 6 (for example, in the case of W-CDMA, the random access channel as shown in 3GPP). The random access channel contains information about the data transmission rates for downlink transmission data from the mobile station 6, which are normally set at maximum values.

Receiving the information from the mobile station 6, the base stations 51 to 53 report the requests from the mobile station 6 to the base station host apparatus 1. It is assumed that, before that, the base station host apparatus 1 has already recognized resource-related information including the resource use conditions about the base stations 51 to 53. On the basis of the resource-related information containing the radio resource use conditions, the base station host apparatus 1 determines, for the base stations 51 to 53, transmission rates for downlink data to the mobile station 6. The base stations 51 to 53 can inform the mobile station of the determined transmission rates of the base stations 51 to 53 by inserting, in 3GPP, slot format, TFCI (Transport Format Combination Indicator) into the downlink data DD1 to DD3 to the mobile station 6.

In the case of OFDM, the values of transmission rates can be adjusted by selecting subcarriers to be used, as described with FIG. 24. In the case of W-CDMA, they can be adjusted by performing channel coding that can be sent with a low spreading ratio. For the channel coding, in W-CDMA, for example, the channel coding defined in 3GPP TS25.212 can be used. This preferred embodiment has chiefly described downlink transmission, but uplink transmission can also be controlled in the same way, of course.

Thus, the throughput of the radio resource control by the base station host apparatus 1 can be enhanced, while the mobile station 6 is communicating simultaneously with multiple base stations 51 to 53. This will be described in detail below.

In the mobile communications system of the second preferred embodiment, when the base station host apparatus desires to communicate with one mobile station at as large a transmission rate as possible through multiple base stations, it recognizes the conditions of use of resources and provides control to vary the transmission rates of the multiple base stations that are radio-communicating with that mobile station (radio resource control).

As a result, the resource control is simplified by using the conditions of use of resources as a criterion for varying the transmission rates, whereby the throughput of the radio resource control by the base station host apparatus 1 is enhanced.

Third Preferred Embodiment

FIG. 26 is a diagram illustrating the configuration of a mobile communications system according to a third preferred embodiment of the present invention. The diagram (a) shows a normal condition, and the diagram (b) shows a condition in which some line is unstable.

As shown in the diagrams, like the configuration of the first preferred embodiment shown in FIG. 1, the mobile communications system of the third preferred embodiment has a network composed of base stations 71 to 74 and a base station host apparatus 7 connected to all base stations 71 to 74, and a mobile station 8 can communicate simultaneously with the multiple base stations 71 to 74.

In FIG. 26, the mobile station (terminal) 8 is communicating simultaneously with all base stations 71 to 74. Also, as in the configuration of FIG. 16, the mobile station 8 is sending/receiving different data respectively with the base stations 71 to 74. For example, the mobile station 8 is sending data D to the base station 71, and sending data B, which is different from data D, to the base station 72. Also, the mobile station 8 is sending data A, which is different from data D and data B, to the base station 73. Also, the mobile station 8 is sending data C, which is different from data D, data B and data A, to the base station 74.

Under the normal condition shown in FIG. 26($a$), the qualities of the lines between the mobile station 8 and the base stations 71 to 74 are all good and stable. On the other hand, in the condition shown in FIG. 26($b$) where some line is unstable, the qualities of the lines between the mobile station 8 and the base stations 71, 72, 74 are good, but the quality of the line between the mobile station 8 and the base station 73 is not good but unstable.

Figure 27:
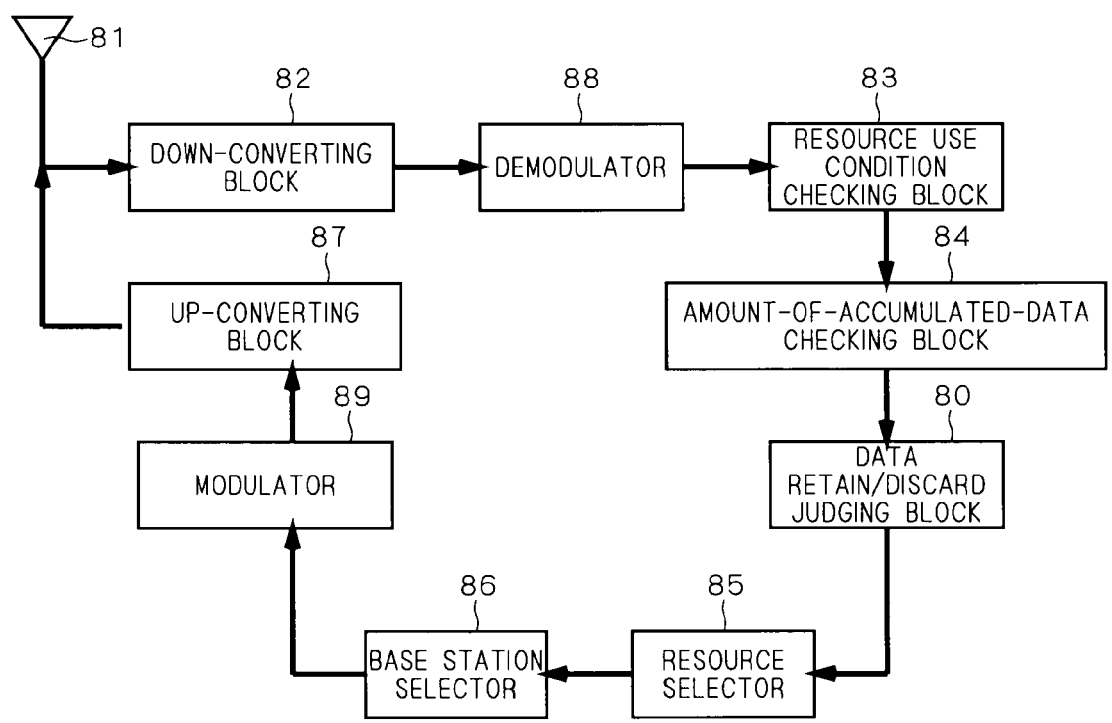
FIG. 27 A block diagram illustrating the internal configuration of a mobile station in the mobile communications system of the third preferred embodiment.

FIG. 27 is a block diagram illustrating the internal configuration of the mobile station 8 in the mobile communications system of the third preferred embodiment. As shown in the diagram, the mobile station 8 includes a data retain/discard judging block 80, an antenna block 81, a down-converting block 82, a resource use condition checking block 83, an amount-of-accumulated-data checking block 84, a resource selector 85, a base station selector 86, an up-converting block 87, a demodulator 88, and a modulator 89.

The data retain/discard judging block 80 judges whether to discard or retain data when its radio line quality is unstable. The details of the operation of the data retain/discard judging block 80 will be fully described later. The components 81 to 89 cited above are the same as the components 21 to 29 of the mobile station 2 shown in FIG. 8, and so they are not described again here.

Now, for the mobile communications system of the third preferred embodiment, a method for judging whether line quality is unstable or not will be described referring to FIG. 27. The third preferred embodiment mainly describes transmission/reception of uplink data.

The configuration shown in FIG. 27 is similar to the functional block for selecting resources described in the first preferred embodiment (see FIG. 8). When the functions of the third preferred embodiment are controlled by the mobile station 8, the functional block of FIG. 27 resides in the mobile station 8 as explained above.

When the functions of the third preferred embodiment are controlled by the network side, e.g. the base stations 71 to 74 or the base station host apparatus 7, the functional block configured as shown in FIG. 27 resides in the base stations 71 to 74 or the base station host apparatus 7.

In FIG. 27, the data retain/discard judging block 80 judges whether to retain or discard data on the basis of comparison between time limit information etc. about data discard and current measurements. The time information includes transmission discard-time, or information about delay permissible for data; the time limit information etc. managed by the data retain/discard judging block 80 includes, in addition to the time limit information, attribute information about bands to be ensured (=transmission QoS (Quality of Service), reception QoS), or mobile stations' maximum intermediate processing buffer size (=mobile station buffer size).

The current measurements include the time passed from data reception to current time, or average data rate per unit time, or the amount of data from the oldest data for which ACK is not sent back by ARQ to the data sent after that and for which ACK has been sent back (=mobile station intermediate buffer size). The above-described time limit information and attribute information are reported to communicable base stations when channels are set. When such comparison indicates that a threshold for judging whether to retain or discard data is exceeded, the data retain/discard judging block 80 judges it is an emergency mode in which transmission data should be discarded.

In this way, the data retain/discard judging block 80 judges whether to discard transmission data while data is transmitted to a certain base station among multiple base stations. Accordingly, in the condition shown in FIG. 26(*b*), when communication with (a certain base station) is in bad condition and the above-mentioned data retain/discard judgment threshold is exceeded, it judges that the data transmitted to the base station 73 should be discarded and that it is an emergency mode. In emergency mode, the mobile communications system of the third preferred embodiment operates as shown below.

In a condition as shown in FIG. 26(*b*) where some line is unstable, when the data retain/discard judging block 80 has judged it is an emergency mode but the mobile station 8 has to send data A to the end without fail, then the mobile station 8 sends the data A in a distributed manner to the base stations 71, 72 and 74 to which the data A was not sent before that, so that the data A can be quickly sent to the base stations 71, 72 and 74.

When the distributed data A are received in the base stations 71, 72 and 74, the distributed data A can be united as follows: the base stations 71, 72 and 74 communicate with each other and combine the distributed data A; or the base station host apparatus 7 collects and rearranges the distributed data A received from the base stations 71, 72 and 74. Alternatively, the distributed data A can be united by a method in which the base stations 71, 72 and 74 communicate with each other and rearrange the data A in order, and send it to the base station host apparatus 7.

Also, the number of neighboring base stations that are changed to the transmission of data A can be controlled according to the degree of emergency. This can be realized when the data retain/discard judging block 80 further has a function of judging the degree of emergency and the base station selector 86 has a function of selecting to which base stations the data A should be sent. In this case, the base station selector 86 contains "relevancy (communication attribute values)" in numerical form indicating to which base stations the data A is likely to be sent in emergency mode. Parameters indicating the degree of relevancy (relevancy parameters (communication attribute value parameters)) include (A) line quality, (B) base station distance information/mobile station position information, (C) mobile station moving speed information, and (D) mobile station moving direction information.

FIG. 28 is a diagram illustrating, in tabular form, the contents of the selection of base stations in emergency based on the relevancy parameters. FIG. 28 shows an example in which the mobile station 8 specifies the degree of relevancy and judges which base stations should be changed to the transmission of data A in the event of an emergency.

As shown in the diagram, for the relevancy parameters, (A) line quality, (B) base station distance information, (C) mobile station moving speed information, and (D) mobile station moving direction information are classified into levels from 0 to 63, where a larger value of (A) line quality indicates better line quality. A larger value of (B) base station distance information indicates a larger distance between the mobile and base stations. (C) Mobile station moving speed information indicates the speed of movement of the mobile station, where a larger value indicates a higher speed. The values differ among the base stations because the moving speed appears different when seen from the individual base stations. The moving speed appears smaller when the distance between the base and mobile stations is larger, than when the distance is smaller. (D) Mobile station moving direction information is numerical information indicating whether the mobile station is moving nearer to or away from the individual base stations. A larger value indicates that the mobile station is moving nearer to the base station. The level values are obtained similarly to parameters that are used for soft handover defined by 3GPP, for example.

Attribute values are obtained respectively for the base stations 71 to 74 on the basis of the relevancy parameters. The attribute value (E) is obtained by expression (A)−(B)+(C)+(D). The threshold for the attribute values (E) is set at 60, and the base stations 71 and 72 exceeding the threshold are selected for the communication of data A in the event of an emergency of the base station 73.

Also, on the basis of (A) line quality, transmission rates for the individual base stations are determined to be used when the communication is changed to data A. When the transmission rate is set at 64 kbps when (A) line quality is 50 or higher and 63 or lower, and is set at 32 kbps when (A) line quality is 32 or higher and 49 or lower, then the mobile station 8 is changed to send the data A to the base station 71 at a transmission rate of 64 kbps in emergency. Also, the mobile station 8 is changed to send the data A to the base station 72 at a transmission rate of 32 kbps in emergency. The description has mainly explained uplink data communication, but the same control can be made for downlink data communication.

When the contents of data communication in emergency are changed not under the initiative of the mobile station 8 but under the initiative of the base stations 71 to 74, the base stations 71 to 74 respectively measure and hold the relevancy parameters shown in FIG. 28, and the mobile station 8 sends data A to base stations that have recognized by themselves that they are selected for emergency. The same control can be made also for downlink data.

In this way, in the mobile communications system of the third preferred embodiment, the mobile station 8 can control the radio resources of the base stations 71 to 74 when quality deteriorates and line condition becomes unstable on any lines between the mobile station 8 and the base stations 71 to 74, whereby the data communication can be more often completed without break and substantial throughput is enhanced.

That is, according to the mobile communications system of the third preferred embodiment, the conditions of communication are checked on the basis of the communication attribute values (E) to select a favorably communicating base station, and the base station selector 86 of the mobile station 8 selects the favorably communicating base station as a destination of transmission of data that the data retain/discard judging block 80 has decided to discard, whereby, even when the transmission of data to a communicating base station falls into difficulties, the transmission data can be sent to the favorably communicating base station to normally complete the transmission of data.

The third preferred embodiment has described transmission of uplink data from the mobile station 8 to the base stations 71 to 74, but transmission of downlink data from the base stations to mobile station can be similarly controlled. And the same effects are obtained.

In this case, when the mobile station 8 leads the control, control at high speed is possible because it progresses without via the base station host apparatus 7.

Also, like the process for completing data transmission/reception on a line in the even of an emergency, the method of selecting base stations on the basis of the above-described relevancy parameters (line quality, base station distance information, mobile station moving speed information, mobile station moving direction information) can be used to enhance throughput not in emergency but under normal conditions.

Figure 29:
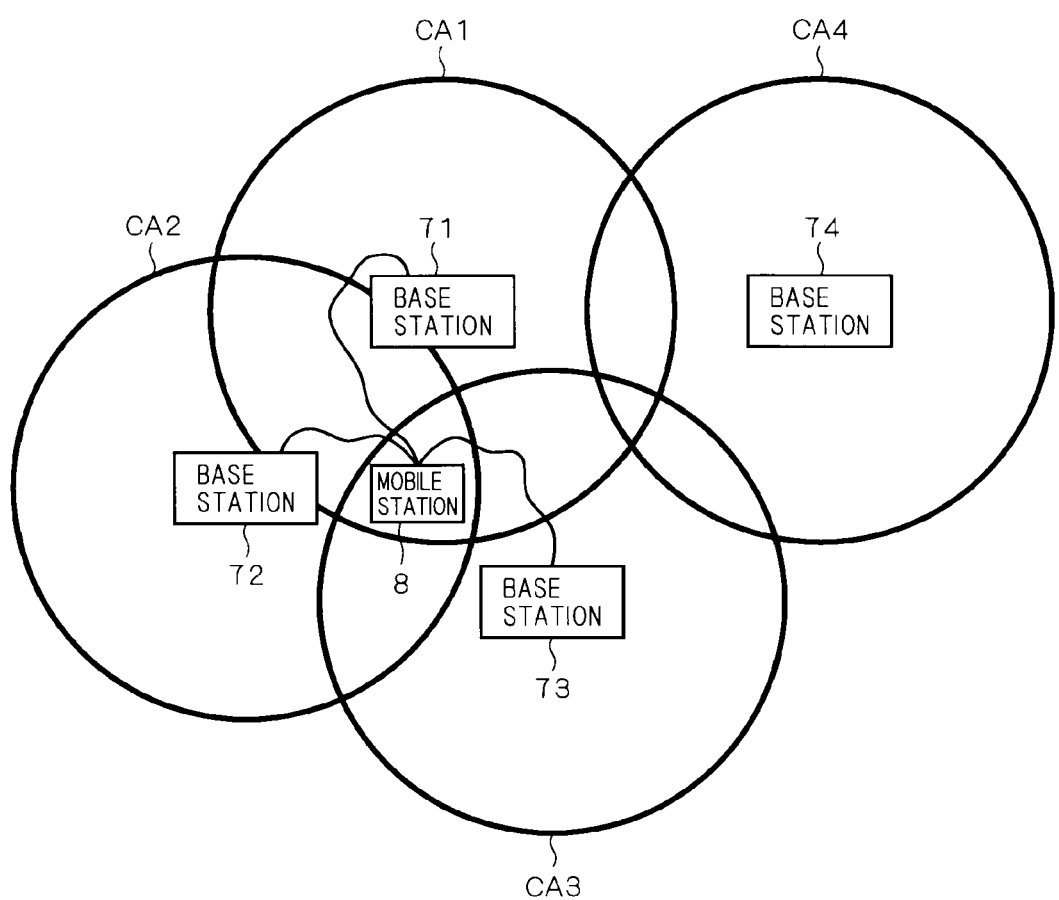
FIG. 29 A diagram illustrating a method for enhancing throughput under normal conditions in the mobile communications system of the third preferred embodiment.
Figure 30:
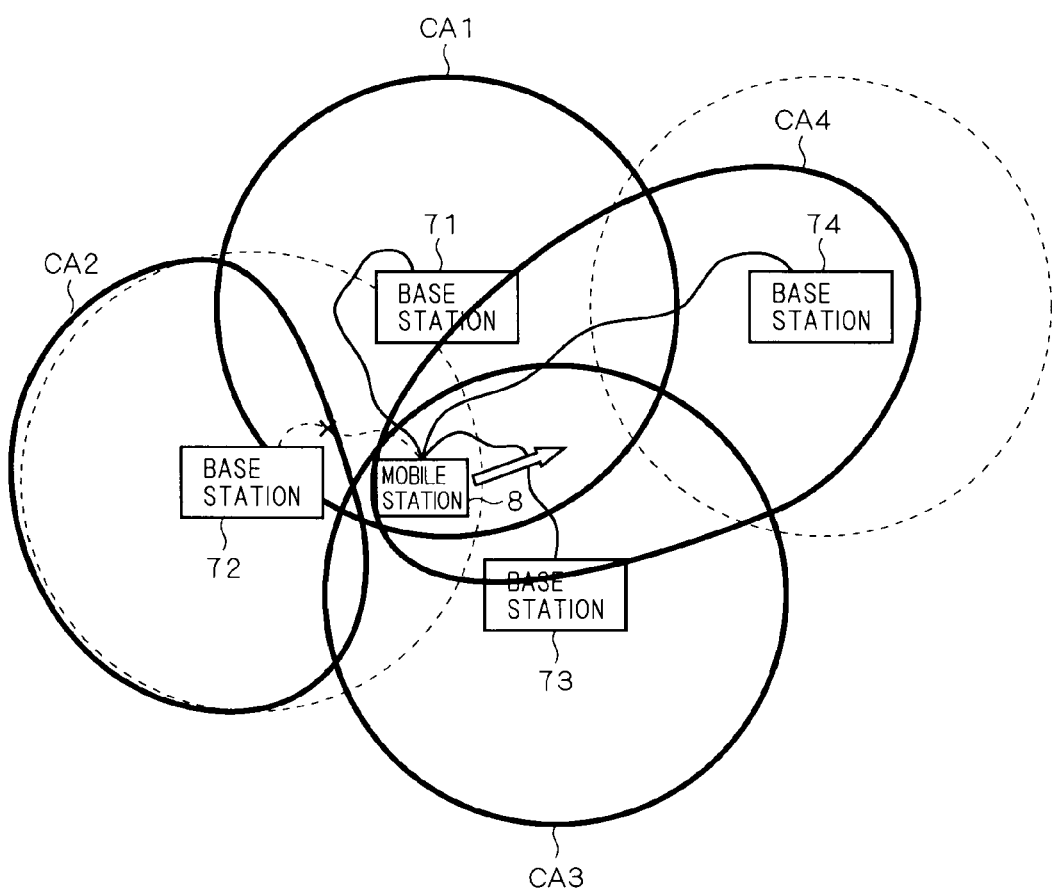
FIG. 30 A diagram illustrating the method for enhancing throughput under normal conditions in the mobile communications system of the third preferred embodiment.

FIGS. 29 and 30 are diagrams illustrating a method for enhancing throughput under normal conditions in the mobile communications system of the third preferred embodiment. FIG. 29 conceptually illustrates the relation among positions of the four base stations 71 to 74 and the mobile station 8, seen from right above the ground. The mobile station 8 is within cell areas CA1 to CA3 of three base stations 71 to 73 among the base stations 71 to 74, and it is capable of communicating simultaneously with the base stations 71 to 73. FIG. 29 shows the mobile station 8 standing still. In the condition shown in FIG. 29, the mobile station 8 and the base station 71, the mobile station 8 and the base station 72, and the mobile station 8 and the base station 73 may be sending/receiving different data or the same data.

When the mobile station 8 collectively manages the relevancy parameters about the base stations 71 to 74, it is assumed that the mobile station 8 is also managing the relevancy parameters about the base station 74 obtained from the base station 71 or 73, for example. When the mobile station 8 is standing still, the radiuses of the cell areas CA1 to CA4, in which the base stations 71 to 74 can communicate, have fixed values, and the cell areas CA1 to CA4 are circular in shape.

In this condition, as shown in FIG. 30, when the mobile station 8 moves toward the base station 74, the mobile station 8 refers to the contents of the mobile station moving speed information and mobile station moving direction information about the base station 74 in the relevancy parameters, and gives an instruction to the base station 71 (or base station 72, 73) to change the shape of the cell area CA4 so that the mobile station 8 is contained in the cell area CA4 of the base station 74. On the basis of the instruction from the mobile station 8 obtained via other base station 71 (or base station 72, 73) that is in communication with the mobile station 8, the base station 74 performs, e.g., beam forming, toward the mobile station 8 to change the shape of the cell area CA4 so that the mobile station 8 is contained in the cell area CA4 as shown in FIG. 30.

That is, as the parameter values of the mobile station moving speed information and mobile station moving direction information about the base station 74 become larger, the mobile station 8 instructs the base station 74 to direct the beam (the shape of the cell area CA4) more toward the mobile station 8.

On the other hand, for the base station 72, the values of the mobile station moving speed information and mobile station moving direction information in its relevancy parameters both become smaller, and so the mobile station 8 instructs the base station 72 not to direct the beam toward it. The mobile station moving speed information and mobile station moving direction information are added or multiplied and recognized as one value. Alternatively, the two pieces of information may be added after multiplied by different weighting coefficients.

When the value of line quality in the relevancy parameters about the base station 74 exceeds a certain threshold determined by time limit information etc., the mobile station 8 controls to ensure radio resources of the base station 74. On the other hand, when the value of line quality with the base station 72 falls below a certain threshold, the mobile station 8 controls to disconnect the radio resources of the base station 72. In order to promptly complete transmission/reception of data with the base station 72 to be disconnected, the mobile station attempts to promptly send/receive data with the base station 72 by also using resources of the base stations 71 and 73. "Directing the beam" means an operation in which a base station generates such a beam pattern as to strengthen the transmission power toward the mobile station, with multiple antennas of the base station provided with directivity. "Not directing the beam" means generation of such a beam pattern as to weaken the transmission power toward the mobile station. Null may be directed to the mobile station.

"Null" will be described below. In beam forming with an array antenna having multiple branches, a beam pattern having main and side lobes is generated. The areas between the main and side lobes, and between other lobes, are shaped like valleys of beam, and no beam arrives in these areas. The areas are called "null". "Directing the beam" means to control to direct the main lobe toward the mobile station.

When not the mobile station 8 but the network side, e.g. the base station host apparatus 7, manages the relevancy parameters, the network side monitors, from the base stations 71 to 73 connected to the mobile station 8, the relevancy parameters indicating the attributes between the mobile station and each base station (line quality, base station distance information, mobile station moving speed information, mobile station moving direction information). When the mobile station 8 starts moving from the position of FIG. 29 toward the base station 74, the base station host apparatus 7 (network side) recognizes it from the values of the mobile station moving direction information etc. in the relevancy parameters. On the basis of the value of the mobile station moving speed information and the value of the mobile station moving direction information, the base station host apparatus 7 (network side) directs the beam of the cell of the base station 74 toward the mobile station 8. In order to obtain a value for controlling the beam of the base station 74 from the mobile station moving speed information value and mobile station moving direction information, the values obtained from the two pieces of information may be added, or multiplied, or may be added after multiplied by weighting coefficients.

In this way, as the value obtained on the basis of the mobile station moving speed information and mobile station moving direction information becomes larger, the beam of the base station 74 is directed toward the mobile station 8 more intensively. When the value of line quality parameter in the relevancy parameters between the mobile station 8 and the base station 74 exceeds a certain threshold, the base station host apparatus 7 controls resources such that the base station 74 communicates with the mobile station 8. Communication between the mobile station 8 and the base station 74 is then started.

On the other hand, in the relevancy parameters between the mobile station 8 and the base station 72, the value for controlling the beam of the base station 72, obtained from the mobile station moving speed information and mobile station moving direction information, becomes smaller, and so the degree to which the beam from the base station 72 is directed toward the mobile station 8 is made less. When the value of line quality in the relevancy parameters between the mobile station 8 and the base station 72 falls below a certain threshold, the base station host apparatus 7 controls radio resources to cause the base station 72 to disconnect the communication with the mobile station 8. In order to complete the transmission/reception of data with the base station 72 to be disconnected, the base station host apparatus 7 makes an attempt so that the same data as that being communicated between the mobile station 8 and the base station 72 can be promptly sent to/received from the base stations 71 and 73.

In this way, in the mobile communications system of the third preferred embodiment, on the basis of the mobile station moving speed information and mobile station moving direction information in the relevancy parameters, the mobile station 8 preferentially achieves the following processes in the early stages: to ensure radio resources and establish communication with a base station existing in the destination of movement; and to disconnect and release radio resources of a base station existing in the direction from which it moves away. This makes it possible to enhance the throughput in the mobile communications system in which the mobile station can communicate simultaneously with multiple base stations. Also, this makes it possible to further reduce power consumption of the communicating base station existing in the direction from which the mobile station moves away.

Also, as shown in FIG. 9, imagine a system in which local servers 91 to 94 are connected respectively to the base stations 11 to 14 (corresponding to the base stations 71 to 74), and pieces of information respectively from the local servers 91 to 94 can be transmitted to the mobile station 8. In this case, the base station that exists in the direction to which the mobile station 8 moves nearer can be connected to the mobile station 8 at an earlier stage, so that the user of the mobile station 8 can earlier know information about the destination, or the user can obtain desired information timely. That is, it is possible to earlier obtain local information (for each place) that the base station at the destination generally contains about its neighborhood.

Figure 31:
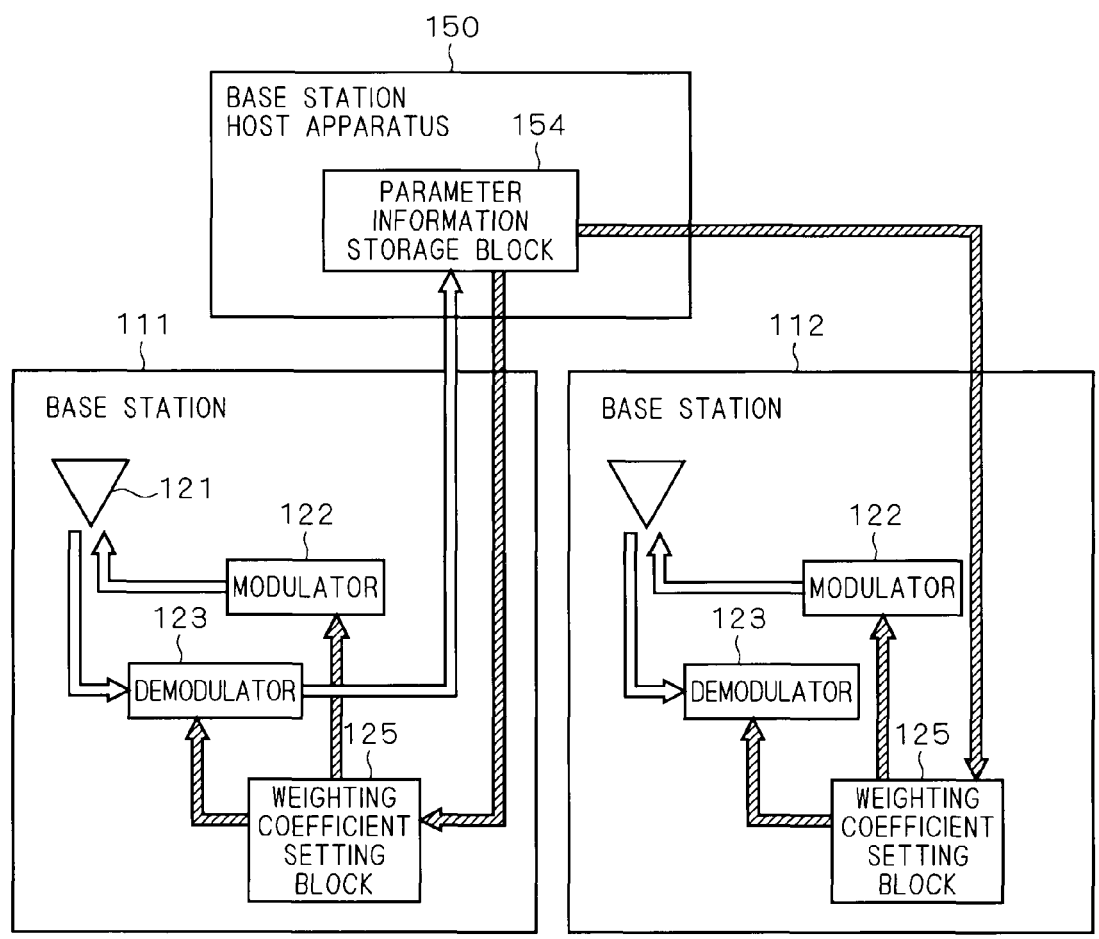
FIG. 31 A block diagram illustrating the configurations of base stations and a base station host apparatus in a first system in the mobile communications system of the third preferred embodiment.

FIG. 31 is a block diagram illustrating the configurations of base stations and a base station host apparatus of a first system for realizing the throughput enhancing method under normal conditions in the mobile communications system of the third preferred embodiment shown in FIGS. 29 and 30.

FIG. 31 shows the configurations of base stations and a base station host apparatus of the third preferred embodiment in which the cells of the base stations can be changed under the control by the base station host apparatus on the basis of the relevancy parameters as shown in FIG. 28, such as the mobile station moving speed information and mobile station moving direction information.

FIG. 31 shows a configuration in which two base stations 111 and 112 are connected to one base station host apparatus 150.

The base stations 111 and 112 each include an antenna block 121, a modulator 122, a demodulator 123, and a weighting coefficient setting block 125. The antenna block 121 performs transmission/reception with the mobile station 8 and other base stations. The modulator 122 modulates data to be transmitted. The demodulator 123 demodulates received channels.

The weighting coefficient setting block 125 sets weighting coefficients for changing the beam pattern of the modulator 122 or demodulator 123 by signal processing.

The base station host apparatus 150, corresponding to a base station control apparatus or core network, includes a parameter information storage block 154. The parameter information storage block 154 stores the relevancy parameters shown in FIG. 28, including the mobile station moving speed information and mobile station moving direction information.

Now, referring to FIGS. 29 to 31, the operation for changing the beam pattern will be described in which a base station that exists in the destination of movement of the mobile station 8 in the direction to which the mobile station 8 moves nearer changes the cell form so that the mobile station can be included in the cell area earlier.

For convenience of explanation, it is assumed that the base station 111 of FIG. 31 corresponds to the base station 72 of FIGS. 29 and 30, and the base station 112 corresponds to the base station 74 shown in FIGS. 29 and 30.

In each of the base station 111 and the base station 112, uplink data from the mobile station 8 is received in the antenna block 121 and demodulated in the demodulator 123. In this process, pieces of information for generating the relevancy parameters as shown in FIG. 28, such as the mobile station moving speed information and mobile station moving direction information, are measured from, e.g. information about the positions of path detection as shown in FIG. 15, and the relevancy parameters are informed to the base station host apparatus 150, and the relevancy parameters about individual base stations are stored in the parameter information storage block 154 in the base station host apparatus 150. That is, relevancy parameters as shown in FIG. 28 are collected into the parameter information storage block 154.

On the basis of the mobile station moving speed information and mobile station moving direction information in the relevancy parameters stored in the parameter information storage block 154, the base station host apparatus 150 recognizes that the mobile station 8 is moving toward the base station 112 away from the base station 111. In this case, the base station host apparatus 150 gives an instruction to the weighting coefficient setting block 125 of the base station 111 to cause it to set weighting coefficients such that the beam pattern is formed to exclude the mobile station 8 from the cell area, and it also gives an instruction to the weighting coefficient setting block 125 of the base station 112 to cause it to set weighting coefficients such that the beam pattern is formed to include the mobile station into the cell area.

As a result, the base station 112 (the base station 74 of FIGS. 29 and 30) becomes capable of receiving data from the mobile station 8 that it could not receive before that, and also becomes capable of sending data to the mobile station 8 that it could not send before that.

Figure 32:
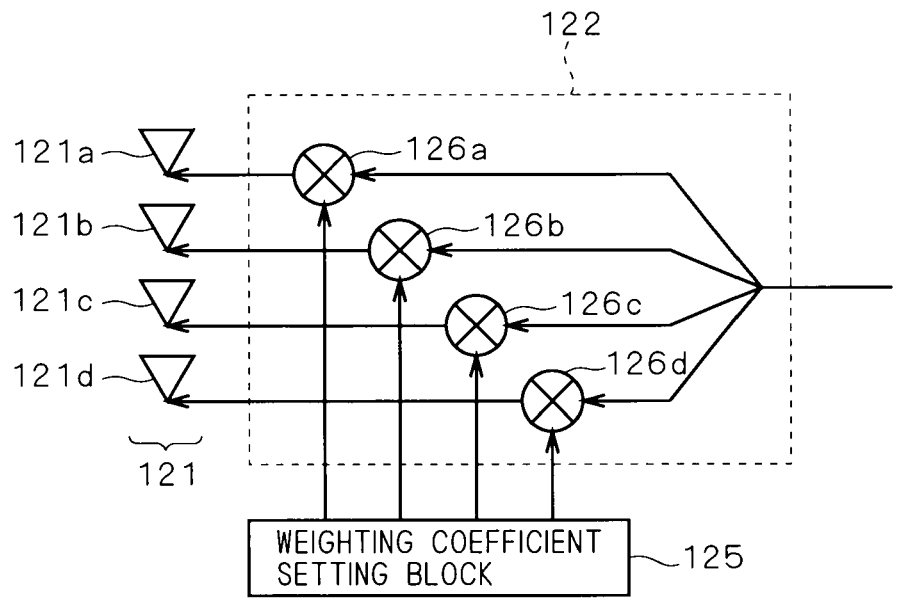
FIG. 32 A diagram illustrating the details of the antenna block and modulator of FIG. 31.
Figure 33:
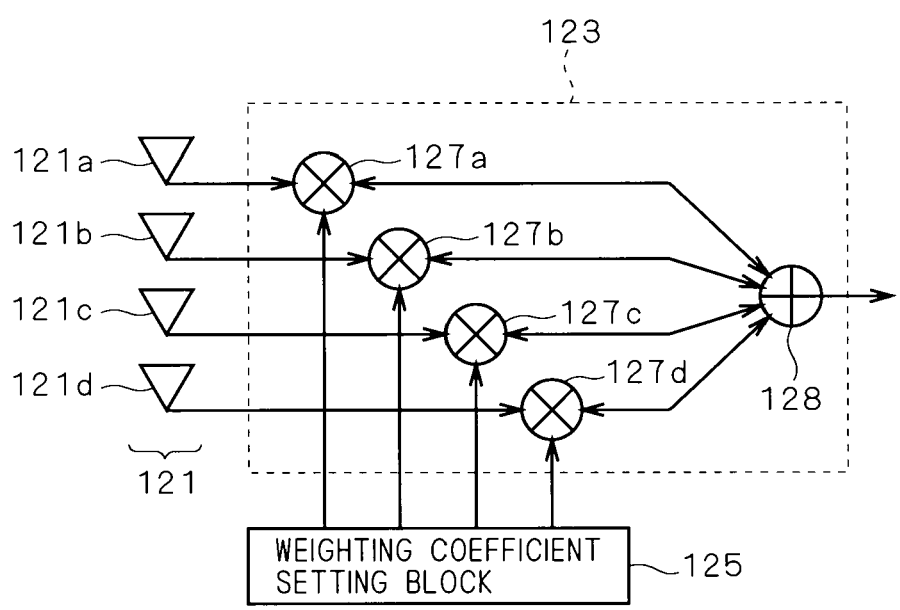
FIG. 33 A diagram illustrating the details of the antenna block and demodulator of FIG. 31.

FIG. 32 is a diagram illustrating the details of the antenna block 121 and the modulator 122. FIG. 33 is a diagram illustrating the details of the antenna block 121 and the demodulator 123. These diagrams show the configurations of the antenna block 121, modulator 122 and demodulator 132 for changing the beam pattern by signal processing based on the weighting coefficients set by the weighting coefficient setting block 125.

As shown in FIG. 32, the antenna block 121 includes antenna branches 121*a* to 121*d* and the modulator 122 includes multipliers 126*a* to 126*d* in correspondence with the antenna branches 121*a* to 121*d*, and the multipliers 126*a* to 126*d* perform multiplications by using weighting coefficients set by the weighting coefficient setting block 125. The values of the weighting coefficients set in the multipliers 126*a* to 126*d* have a positive correlation with the magnitude of the amplitude of the processed signal and the amount of phase rotation. Accordingly, the transmission abilities of the antenna branches (121*a* to 121*d*) become higher as relatively larger weighting coefficients are set in the corresponding multipliers (126*a* to 126*d*).

As shown in FIG. 33, the demodulator 123 includes multipliers 127*a* to 127*d* in correspondence with the antenna branches 121*a* to 121*d*, and the multipliers 127*a* to 127*d* perform multiplications by using weighting coefficients set by the weighting coefficient setting block 125. The results of multiplications by the multipliers 127*a* to 127*d* are added in an adder 128 to give a demodulated signal. The values of the weighting coefficients set in the multipliers 127*a* to 127*d* have a positive correlation with the magnitude of the amplitude of the processed signal and the amount of phase rotation. Accordingly, the reception abilities of the antenna branches (121*a* to 121*d*) become higher as relatively larger weighting coefficients are set in the corresponding multipliers (126*a* to 126*d*).

In this way, the cell areas can be changed in shape as shown in FIG. 29 and FIG. 30 by varying the beam patterns by appropriately setting the weights in the multipliers 126*a* to 126*d* in the modulator 122 and the multipliers 127*a* to 127*d* in the demodulator 123 associated with the antenna branches 121*a* to 121*d*.

Figure 34:
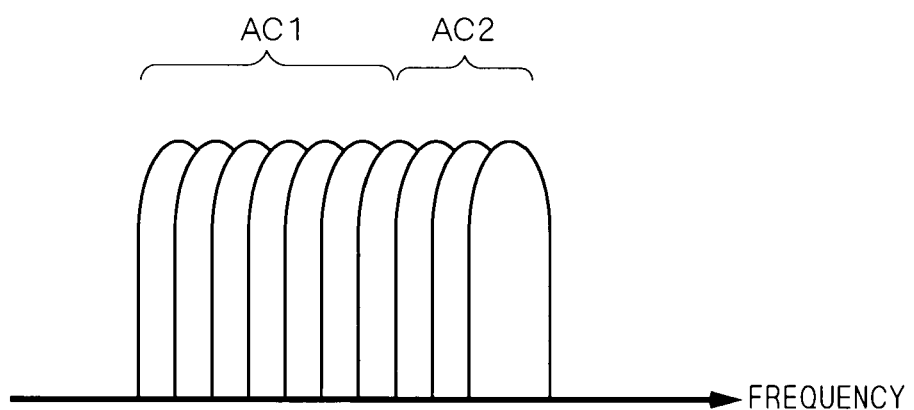
FIG. 34 A diagram illustrating frequency bands assigned to mobile stations 8.

FIG. 34 is a diagram illustrating frequency bands that are assigned to the mobile station 8. As shown in the diagram, by OFDM, a relatively wide frequency band may be assigned to a mobile station that is moving nearer (approaching mobile station assignment AC1), and a relatively narrow frequency band may be assigned to a mobile station that is moving away (mobile station assignment AC2). In this case, in the configurations of the base stations 111 and 112, the weighting coefficient setting block 125 serves as a subcarrier assigning block, and controls to assign a larger number of subcarriers to an approaching mobile station. This stabilizes the communication with the approaching mobile station and facilitates handover, while the communication with the separating mobile station becomes more unstable and it becomes easier to disconnect the line.

Handover between a mobile station and a base station toward which the mobile station is approaching may be achieved by a high-speed scheduling (a scheduling that gives high priority to handover processing), while handover with a base station from which the mobile station separates away may be achieved by a low-speed, rough scheduling (a scheduling without real time property that gives low priority to handover processing). In this case, the base stations can be lower-priced.

In this way, with the first system in the mobile communications system of the third preferred embodiment, under the control of the base station host apparatus 150 based on information about the moving direction and moving speed of the mobile station, a non-communicating base station, among multiple base stations, that exists in the direction to which the mobile station moves nearer is controlled to go into a communicating state at an early stage, and a communicating base station that exists in the direction from which the mobile station moves away is controlled to go into a released state at an early stage, which enhances the throughput of the mobile communications system. Also, it is possible to further reduce the power consumption of the communicating base station that exists in the direction from which the mobile station moves away.

FIG. 35 is a block diagram illustrating the configurations of base stations and a mobile station of a second system for realizing the throughput enhancing method under a normal condition in the mobile communications system of the third preferred embodiment shown in FIGS. 29 and 30.

FIG. 35 shows the configuration of base stations and a mobile station of the third preferred embodiment in which the cells of the base stations can be changed under the control by the mobile station, on the basis of the relevancy parameters as shown in FIG. 28, such as the mobile station moving speed information and mobile station moving direction information.

FIG. 35 shows a configuration including one mobile station 130 and two base stations 113 and 114.

The base stations 113 and 114 each include an antenna block 121, a modulator 122, a demodulator 129, and a weighting coefficient setting block 125. The antenna block 121 performs transmission/reception with the mobile station 130. The modulator 122 modulates data to be transmitted. The demodulator 129 demodulates received channels. When the contents of demodulation include an weighting instruction from the mobile station 130, the contents of the instruction are given to the weighting coefficient setting block 125.

The weighting coefficient setting block 125 sets weighting coefficients for changing the beam pattern of the modulator 122 or demodulator 129 by signal processing.

The mobile station 130 includes a parameter information storage block 134 that stores relevancy parameters including mobile station moving speed information and mobile station moving direction information. The relevancy parameters stored in the parameter information storage block 134 can be modulated in the modulator 132 and sent to the base station 113 and the base station 114 from the antenna block 131. Also, information about the relevancy parameters from the base stations 113 and 114 is received in the antenna block 131, demodulated in the demodulator 133, and stored in the parameter information storage block 134.

Now, referring to FIGS. 29, 30 and 35, the operation for changing the beam pattern will be described in which a base station that exists in the destination of movement of the mobile station 130 in the direction to which the mobile station 130 moves nearer changes the cell form so that the mobile station can be included into the cell area earlier.

For convenience of explanation, it is assumed that the base station 113 of FIG. 35 corresponds to the base station 72 of FIGS. 29 and 30, the base station 114 corresponds to the base station 74 shown in FIGS. 29 and 30, and the mobile station 130 corresponds to the mobile station 8.

In the mobile station 130, data from the base station 113 is received in the antenna block 131, down-converted, and demodulated in the demodulator 133. In this process, mobile station moving speed information and mobile station moving direction information are measured from, e.g. information about the positions of path detection as shown in FIG. 15, and the information is stored in the parameter information storage block 154 as relevancy parameters.

On the basis of the relevancy parameters in the parameter information storage block 154, the mobile station 130 recognizes that it is moving away from the base station 113 toward the base station 114. The mobile station 130 sends a signal to the weighting coefficient setting block 125 of the base station 113 through the modulator 132 and the antenna block 131, so as to instruct it to set weighting coefficients to vary the beam pattern such that the mobile station 130 is excluded from the cell area of the base station 113 early.

On the other hand, to the weighting coefficient setting block 125 of the base station 114, the mobile station 130 sends a signal through the modulator 132 and the antenna 113, so as to instruct it to set weighting coefficients to vary the beam pattern so that the mobile station 130 is included in the cell area early. The contents of the transmission are sent to the base station 114 through the base station 113 that is in communication with the mobile station 130.

As a result, the base station 114 becomes capable of receiving data from the mobile station 130 that it could not receive before that, and also becomes capable of sending data to the mobile station 130 that it could not send before that.

In this way, with the second system in the mobile communications system of the third preferred embodiment, under the control by the mobile station 130 based on information about the moving direction and moving speed of the mobile station, a non-communicating base station, among multiple base stations, that exists in the direction to which the mobile station moves nearer is controlled to go into a communicating state at an early stage, and a communicating base station that exists in the direction from which the mobile station moves away is controlled to go into a released state at an early stage, which enhances the throughput of the mobile communications system. Also, it is possible to further reduce the power consumption of the communicating base station that exists in the direction from which the mobile station moves away.

The configuration of the modulator 122 and the antenna block 121 for varying the beam pattern by signal processing under the control from the weighting coefficient setting block 125 is similar to the configuration shown in FIG. 32. Also, the configuration of the demodulator 129 and the antenna block 121 for varying the beam pattern by signal processing under the control from the weighting coefficient setting block 125 is similar to the configuration shown in FIG. 33 (it differs only in that the demodulator 123 is replaced by the demodulator 129).

As shown in FIG. 34, by OFDM, a larger number of frequency bands may be assigned to a mobile station that is moving nearer. In this case, in the configuration of the base stations 113 and 114, the weighting coefficient setting block 125 serves as a subcarrier assigning block, and controls to assign a larger number of subcarriers to an approaching mobile station. This stabilizes the communication with the approaching mobile station and facilitates handover, while the communication with the separating mobile station becomes more unstable and it becomes easier to disconnect the line.

Handover between a mobile station and a base station toward which the mobile station is approaching may be achieved by a high-speed scheduling, while handover with a base station from which the mobile station is moving away may be achieved by a low-speed, rough scheduling. In this case, the base stations can be lower-priced.

Figure 36:
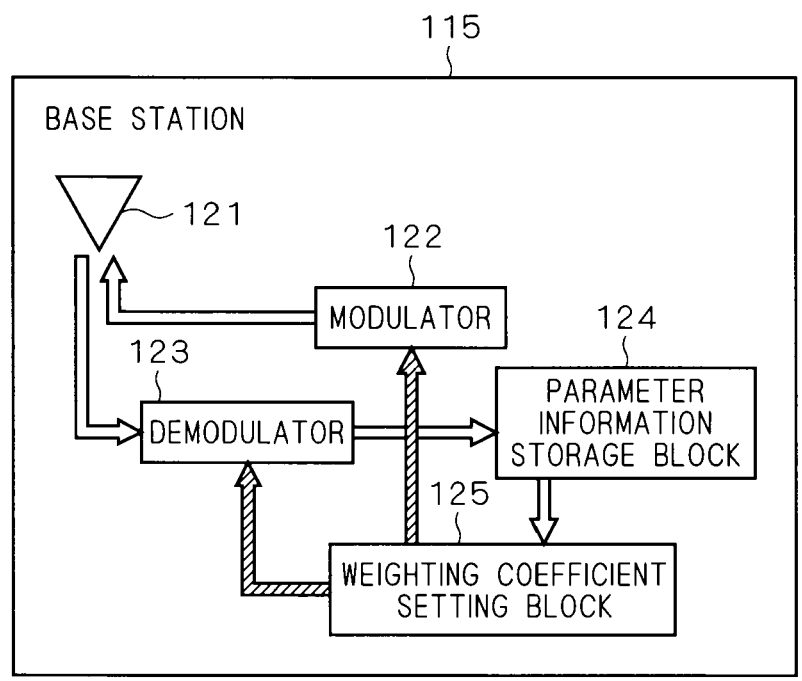
FIG. 36 A block diagram illustrating the configuration of a base station in a third system in the mobile communications system of the third preferred embodiment.

FIG. 36 is a block diagram illustrating the configuration of a base station of a third system for realizing the throughput enhancing method under a normal condition in the mobile communications system of the third preferred embodiment shown in FIGS. 29 and 30.

FIG. 36 shows the configuration of a base station of the third preferred embodiment in which the cell of the base station can be changed under the control of the base station itself, on the basis of the relevancy parameters as shown in FIG. 28, such as the mobile station moving speed information and mobile station moving direction information.

The base station 115 includes an antenna block 121, a modulator 122, a demodulator 123, a parameter information storage block 124, and a weighting coefficient setting block 125. The antenna block 121 performs transmission/reception with the mobile station 130. The modulator 122 modulates data to be transmitted. The demodulator 123 demodulates received channels.

The base station 115 includes the parameter information storage block 124 that stores relevancy parameters including mobile station moving speed information and mobile station moving direction information.

The weighting coefficient setting block 125 sets weighting coefficients for changing the beam pattern of the modulator 122 or demodulator 123 by signal processing on the basis of the relevancy parameters stored in the parameter information storage block 124.

Now, referring to FIGS. 29, 30 and 36, the operation for changing the beam pattern will be described in which a base station that exists in the destination of movement of the mobile station in the direction to which the mobile station moves nearer changes the cell form so that the mobile station can be included into the cell area earlier.

For convenience of explanation, it is assumed that the base station 115 of FIG. 36 corresponds to the base station 74 of FIGS. 29 and 30.

Uplink data from the mobile station 8 is received in the antenna block 121 and demodulated in the demodulator 123. In this process, information for generating the relevancy parameters of FIG. 28, such as information about the positions of path detection, is recognized and stored in the parameter information storage block 124.

The parameter information storage block 124 collects relevancy parameters as shown in FIG. 28 about the base station 115 itself. When a situation in which the mobile station is moving toward the base station 115 is recognized on the basis of the mobile station moving speed information and mobile station moving direction information in the parameter information storage block 124, an instruction is given in order to set weighting coefficients to form such a shape as to allow the mobile station 8 to be sufficiently included in the cell area to enable stable communication (for convenience of explanation, FIG. 36 shows this instruction with the arrow from the parameter information storage block 124 to the weighting coefficient setting block 125). Thus, the communication between the mobile station 8 and the base station 115, which was of poor line quality, can be made with good quality.

In the third system in which the base station 115 itself provides instructions about the contents of settings in the weighting coefficient setting block 125, the communication with the mobile station 8 must be previously established at least to such an extent that the relevancy parameters can be recognized, even if the line quality is poor.

On the other hand, the first and second system configurations (see FIGS. 31 and 35) in which the base station host apparatus 150 or the mobile station 130 provides instructions about a change of the contents of settings in the weighting coefficient setting block 125, it is possible to provide control to change the beam even when the mobile station 8 is out of the cell area.

In this way, with the third system in the mobile communications system of the third preferred embodiment, under the control by the base station 115 itself based on information about the moving direction and moving speed of the mobile station, it goes into a communicating state at an early stage when it is non-communicating and exists in the direction to which the mobile station moves nearer, and it goes into a released state at an early stage when it is communicating and exists in the direction from which the mobile station moves away, which enhances the throughput of the mobile communications system. Also, it is possible to further reduce the power consumption of the communicating base station that exists in the direction from which the mobile station moves away.

The configuration of the modulator 122 and the antenna block 121 for varying the beam pattern by signal processing under the control from the weighting coefficient setting block 125 is similar to the configuration shown in FIG. 32. Also, the configuration of the demodulator 123 and the antenna block 121 for varying the beam pattern by signal processing under the control from the weighting coefficient setting block 125 is similar to the configuration shown in FIG. 33.

As shown in FIG. 34, by OFDM, a larger number of frequency bands may be assigned to a mobile station that is moving nearer. In this case, in the configuration of the base station 115, the weighting coefficient setting block 125 serves as a subcarrier assigning block, and controls to assign a larger number of subcarriers to an approaching mobile station. This stabilizes the communication with the approaching mobile station and facilitates handover, while the communication with a separating mobile station becomes more unstable and it becomes easier to disconnect the line.

Handover between a mobile station and a base station toward which the mobile station is approaching may be achieved by a high-speed scheduling, while handover with a base station from which the mobile station moves away may be achieved by a low-speed, rough scheduling. In this case, the base stations can be lower-priced.

While the invention has been described in detail, the foregoing description is in all aspects illustrative and not restrictive. It is understood that numerous other modifications and variations can be devised without departing from the scope of the invention.

The invention claimed is:

1. A mobile communications system comprising:
a mobile station; and
a plurality of base stations, at least two of the plurality of base stations operating according to different communication schemes and each of the plurality of base stations being configured to report resource-related information to the mobile station,
said mobile station being configured to communicate simultaneously with said plurality of base stations and to recognize the communication scheme that each of the plurality of base stations operate according to based on the resource-related information received from each of the plurality of base stations, and
said mobile station managing resources of said plurality of base stations by first sending a different resource specifying signal simultaneously to each of the plurality of base stations so that each base station simultaneously receives only the resource specifying signal pertinent to that receiving base station, the different resource specifying signals being based on the recognized communications schemes and the resource-related information transmitted from each of the plurality of base stations, wherein the mobile station is configured to then control communications simultaneously to and simultaneously from the plurality of base stations using the resources of the plurality of base stations as specified by the different resource specifying signals.

2. The mobile communications system according to claim 1, wherein
said resource-related information includes resource use information and accumulation information, and said mobile station manages the resources of said plurality of base stations on the basis of said resource-related information about said plurality of base stations.

3. The mobile communications system according to claim 2, wherein
said management of the resources by said mobile station comprises:
(a) making requests respectively to said plurality of base stations for maximum resource environments; and
(b) giving instructions about finally selected resources to said plurality of base stations on the basis of said resource-related information about each of said plurality of base stations.

4. The mobile communications system according to claim 1, wherein
among said plurality of base stations, a resource-related information reporting base station is capable of communicating the resource-related information with a given number of base stations except said resource-related information reporting base station among said plurality of base stations, and said resource-related information includes resource use information and accumulation information,
said resource-related information reporting base station has a function of collectively reporting, to said mobile station, multiple-base-station resource-related information including said resource-related information about said given number of base stations at least, and
said mobile station manages the resources of at least said given number of base stations on the basis of said multiple-base-station resource-related information.

5. A mobile communications system comprising:
a mobile station; and
a plurality of base stations, at least two of the plurality of base stations operating according to different communication schemes and at least one of the plurality of base stations being configured to report resource-related information indicating resources of the plurality of base stations to the mobile station,
said mobile station being configured to communicate simultaneously with said plurality of base stations and to recognize the communication scheme that each of the plurality of base stations operate according to based on the received resource-related information, wherein the mobile station is configured to send a different resource specifying signal simultaneously to each of the plurality of base stations so that each base station simultaneously receives only the resource specifying signal pertinent to that receiving base station, the different resource specifying signals being based on the recognized communications schemes and the resource-related information transmitted from each of the plurality of base stations, and then to communicate simultaneously with the plurality of base stations based on the resources of the plurality of base stations and using the recognized communication scheme that each of the plurality of base stations operate according to,
said mobile station comprising:
a data retain/discard judging function of judging whether to discard transmitted data while transmitting data to a certain base station among said plurality of base stations; and a base station selecting function of recognizing communication attribute values for judging whether communication lines of said plurality of base stations are good or bad, and when judging that said transmitted data should be discarded, selecting as a destination of transmission of said transmitted data a favorably communicating base station that has been judged to be favorably communicating on the basis of said communication attribute values among said plurality of base stations except said certain base station.

6. A mobile station that constitutes a mobile communications system together with a plurality of base stations, said mobile station being capable of communicating simultaneously with said plurality of base stations, said mobile station comprising:

a resource determining function of, on the basis of resource-related information about said plurality of base stations received from at least one of said plurality of base stations, determining which resources of said plurality of base stations are to be used, and a resource specifying function of, on the basis of a content of the determination made by said resource determining function, specifying resources to said plurality of base, wherein at least two of the plurality of base stations operate according to different communication schemes, the mobile station is configured to recognize the communication scheme that each of the plurality of base stations operate according to based on the received resource-related information, and the resource specifying function of specifying the resource is based on the recognized communications schemes, and wherein the mobile station is configured to first send a different resource specifying signal simultaneously to each of the plurality of base stations so that each base station simultaneously receives only the resource specifying signal pertinent to that receiving base station, the different resource specifying signals being based on the recognized communications schemes and the resource-related information transmitted from each of the plurality of base stations, and then to communicate simultaneously with the plurality of base stations based on the resources of the plurality of base stations as specified by the mobile station.

7. The mobile station according to claim 6, wherein said at least one base station includes said plurality of base stations, and said resource specifying function includes a function of specifying resources simultaneously to said plurality of base stations.

8. A mobile station that constitutes a mobile communications system together with a plurality of base stations, said mobile station comprising:

a receiving unit configured to receive resource-related information from each of the plurality of base stations;

a data dividing function of dividing transmission data into a plurality of divided data pieces corresponding to a plurality of resources; and a data transmitting function of assigning said plurality of resources to said plurality of base stations set without overlap based on the resource-related information received from each of the plurality of base stations, and transmitting said plurality of divided data pieces being assigned to said plurality of resources, wherein the mobile station is configured to communicate simultaneously with the plurality of base stations, at least two of the plurality of base stations operate according to different communication schemes, and the mobile station is configured to recognize the communication scheme that each of the plurality of base stations operate according to based on the resource-related information received from each of the plurality of base stations, wherein the mobile station is configured to then communicate simultaneously with the plurality of base stations based on the plurality of resources of the plurality of base stations as assigned by the mobile station.

9. A mobile communications system comprising:

a mobile station; and a plurality of base stations, said mobile station being capable of communicating simultaneously with said plurality of base stations, and resources of said plurality of base stations being managed under control by said mobile station, wherein:

said plurality of base stations each have a function of reporting their respective resource-related information to said mobile station, and said resource-related information includes resource use information and accumulation information, said mobile station manages the resources of said plurality of base stations on the basis of said resource-related information about said plurality of base stations, and said management of the resources by said mobile station comprises:

(a) making requests respectively to said plurality of base stations for maximum resource environments; and (b) giving instructions about finally selected resources to said plurality of base stations on the basis of said resource-related information about each of said plurality of base stations.

10. A mobile communications system comprising:

a mobile station; and a plurality of base stations, said mobile station being capable of communicating simultaneously with said plurality of base stations, and resources of said plurality of base stations being managed under control by said mobile station, wherein among said plurality of base stations, a resource-related information reporting base station is capable of communicating resource-related information with a given number of base stations except said resource-related information reporting base station among said plurality of base stations, and said resource-related information includes resource use information and accumulation information, said resource-related information reporting base station has a function of collectively reporting, to said mobile station, multiple-base-station resource-related information including said resource-related information about said given number of base stations at least, and said mobile station manages the resources of at least said given number of base stations on the basis of said multiple-base-station resource-related information.

\* \* \* \* \*